United States Patent
Georgakopoulos et al.

(10) Patent No.: US 10,909,438 B1
(45) Date of Patent: Feb. 2, 2021

(54) PASSIVE RFID TEMPERATURE SENSORS WITH LIQUID CRYSTAL ELASTOMERS

(71) Applicants: Stavros Georgakopoulos, Miami, FL (US); Yousuf Shafiq, Miami, FL (US)

(72) Inventors: Stavros Georgakopoulos, Miami, FL (US); Yousuf Shafiq, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 16/924,596

(22) Filed: Jul. 9, 2020

Related U.S. Application Data

(60) Provisional application No. 62/873,507, filed on Jul. 12, 2019.

(51) Int. Cl.
| | |
|---|---|
| *G06K 19/077* | (2006.01) |
| *G01K 5/56* | (2006.01) |
| *H01Q 9/06* | (2006.01) |
| *G01K 13/00* | (2006.01) |
| *G01K 1/024* | (2021.01) |

(52) U.S. Cl.
CPC ............ *G06K 19/0775* (2013.01); *G01K 5/56* (2013.01); *G06K 19/07786* (2013.01); *H01Q 9/065* (2013.01); *G01K 1/024* (2013.01)

(58) Field of Classification Search
CPC .... G01K 1/024; G01K 11/26; G01K 2207/00; G01K 3/005; G01K 7/32; G01K 13/00; G01K 1/00; G01K 7/021; G01K 7/20
USPC ..................................................... 340/870.17
See application file for complete search history.

(56) References Cited

U.S. PATENT DOCUMENTS

| | | | | |
|---|---|---|---|---|
| 4,873,113 A | * | 10/1989 | Grein-Wiegand | ..... B41M 5/281 427/2.12 |
| 7,080,593 B1 | * | 7/2006 | Frankel | ................... A47J 36/32 99/326 |
| 7,351,974 B2 | * | 4/2008 | Setlak | .................. G06K 9/0004 250/341.1 |
| 2006/0152313 A1 | * | 7/2006 | Zmood | .................... G01K 7/38 335/208 |
| 2009/0180516 A1 | * | 7/2009 | Den Toonder | ......... G01K 5/486 374/187 |

(Continued)

FOREIGN PATENT DOCUMENTS

| | | | | |
|---|---|---|---|---|
| CN | 202086462 U | * | 12/2011 | |
| CN | 103971157 A | * | 8/2014 | |

(Continued)

OTHER PUBLICATIONS

Naaser A. Mohammed et al., Analysis and Synthesis of UHF RFID Antennas using the Embedded T-match, IEEE RFID 2010, pp. 230-236.

(Continued)

*Primary Examiner* — Gail Kaplan Verbitsky
(74) *Attorney, Agent, or Firm* — Saliwanchik, Lloyd & Eisenschenk

(57) ABSTRACT

Passive radio frequency identification (RFID) real-time temperature sensors based on programmable liquid crystal elastomers (LCEs) are provided. The sensors can be used for monitoring the temperature for various items, including perishable goods, foods, and medicines in the cold supply chain. The sensors can convey changes in temperature through a controlled shift of the operating frequency in the RFID ultra high frequency (UHF) band.

19 Claims, 26 Drawing Sheets

(56) References Cited

U.S. PATENT DOCUMENTS

| | | | |
|---|---|---|---|
| 2012/0201176 A1* | 8/2012 | Su | H04B 1/40 370/280 |
| 2014/0213927 A1* | 7/2014 | Webster | G01K 13/002 600/549 |
| 2018/0026766 A1* | 1/2018 | Li | H04L 5/0048 370/330 |
| 2018/0258920 A1* | 9/2018 | Kessler | H05B 3/06 |
| 2019/0180065 A1* | 6/2019 | Babakhani | G06K 19/0715 |
| 2019/0285483 A1* | 9/2019 | Cheng | G01K 1/026 |
| 2020/0146632 A1* | 5/2020 | Niichel | A61K 9/0053 |
| 2020/0249109 A1* | 8/2020 | Singleton | G01L 9/00 |

FOREIGN PATENT DOCUMENTS

| | | | | |
|---|---|---|---|---|
| CN | 208765863 U | * | 4/2019 | |
| CN | 1115800027 A | * | 5/2020 | |
| EP | 1538559 A1 | * | 6/2005 | ....... G06K 19/07749 |
| JP | 02012007963 A | * | 1/2012 | |
| KR | 880001398 B1 | * | 7/1988 | .............. F24F 11/30 |
| KR | 100764438 B1 | * | 10/2007 | .............. G01K 1/024 |
| KR | 2009067900 A | * | 12/2007 | |
| KR | 101515469 B1 | * | 5/2015 | |

OTHER PUBLICATIONS

R. Bhattacharyya et al., RFID Tag Antenna Based Temperature Sensing in the Frequency Domain, 2011 IEEE International Conferene on RFID, pp. 70-77.

* cited by examiner

PASSIVE RFID TEMPERATURE SENSORS WITH LIQUID CRYSTAL ELASTOMERS

CROSS-REFERENCE TO RELATED APPLICATION

This application claims the benefit of U.S. Provisional Application Ser. No. 62/873,507, filed Jul. 12, 2019, which is hereby incorporated by reference herein in its entirety, including any figures, tables, and drawings

GOVERNMENT SUPPORT

This invention was made with government support under Grant Number 1711467 awarded by National Science Foundation. The government has certain rights in the invention.

BACKGROUND

A substantial variety of essential foods and pharmaceuticals must be maintained within a temperature range to ensure a suitable quality for human consumption. Additionally, 65% of the retail food market consists of fresh-food products. Consequently, due to the safety risk and high consumption rate, temperature monitoring control stages are installed along the cold supply chain. However, these monitoring stations can only exist at discrete locations, such as refrigerated shipping containers and at sending and receiving checkpoints.

These discrete temperature observations are then used to assess the overall condition of the perishable goods. As a result, the temperature conditions due to any problems at intermediate stages are unknown. Common problems that occur in the cold supply-chain include: malfunctioning refrigeration equipment; extended wait-times at the cargo bay; and operator errors. The global sales of organic foods amount to a $81.6 billion industry. Also, 30% of fresh products are wasted at some point during transit in the cold-supply chain.

Currently, Radio frequency identification (RFID) tags for temperature monitoring are available. An example of such a tag is the Freshtime Sensor RFID Classic Tag, which is a semi-passive RFID tag from Infratab. This sensor takes temperature samples and integrates over time to predict the shelf-life of a product. Another example is the i-Q32T from Identec Solutions, which stores temperature readings that can be retrieved from a distance of 100 m. Also, the IDS-SL13A from IDS Microchip AG is a semi-passive temperature data-logger. Although these sensors can provide a suitable form of temperature monitoring, they all have limitations. Specifically, they are costly, require batteries, and do not provide real-time readings. Additionally, temperature indicator labels are commonly used to detect temperature threshold crossing of perishable goods as well. However, these labels can detect only a single temperature threshold violation (single-use), and they convey it through a change in color. Therefore, a clear line-of-visibility is required. Hence, monitoring individual packages over large distances in crowded shipping containers is not practical when using such labels. Accordingly, improved temperature sensors are needed and would provide a cost-effective solution that has potential to yield large savings in the foods and pharmaceutical industries.

BRIEF SUMMARY

Embodiments of the subject invention provide novel and advantageous passive (i.e., battery-free) radio frequency identification (RFID) real-time temperature sensors based on programmable liquid crystal elastomers (LCEs), as well as methods of manufacturing and using the same. The sensors can be used for monitoring the temperature for various applications, including but not limited to temperature monitoring of perishable goods, foods, and medicines in the cold supply chain. The sensors convey changes in temperature through, e.g., a controlled shift of the operating frequency in the RFID ultra high frequency (UHF) band. For example, a sensor can switch its operating frequency from a first frequency to a second frequency (e.g., 902 to 928 megahertz (MHz)) when the temperature reaches a set high threshold and it can also automatically switch its operating frequency back to the first frequency (e.g., 902 MHz) when the temperature drops below the set threshold (e.g., room temperature).

In an embodiment, a passive, RFID temperature sensor can comprise: a ground plane; an antenna disposed above the ground plane; and an LCE disposed between the ground plane and the antenna. The antenna can have a first operating frequency when an ambient temperature is below a predetermined threshold temperature and a second operating frequency different from the first operating frequency when the ambient temperature is at or above the predetermined threshold temperature. The temperature sensor can be configured to operate normally without a battery or other power source. The antenna can be a planar antenna, such as a planar dipole antenna. The planar dipole antenna can comprise an integrated T-match network (ITMN). The temperature sensor can be configured such that the antenna is actuated above the ground plane by the LCE, such that LCE expands or contracts as the temperature changes to change the first operating frequency to the second operating frequency or the second operating frequency to the first operating frequency. The first operating frequency can be, for example, 902 MHz and the second operating frequency can be, for example, 928 MHz. The predetermined threshold temperature can be, for example, 160° C. The LCE can comprise a shape memory polymer. The LCE can be a 4D-printed LCE array. The antenna can be a patch antenna comprising a slot; the temperature sensor can further comprise a switch positioned in the slot of the patch antenna; and the temperature sensor can be configured such that the LCE expands or contracts as the temperature changes to cause the switch to engage or disengage to thereby change the first operating frequency to the second operating frequency or the second operating frequency to the first operating frequency. The switch can be a separate element from the LCE, or alternatively the LCE itself can act as a switch.

In another embodiment, a method of monitoring temperature can comprise: providing a passive, RFID temperature sensor as described herein; and monitoring an operating frequency of the antenna of the temperature sensor, such that when the antenna is operating at the first operating frequency the ambient temperature is below the predetermined threshold temperature and when the antenna is operating at the second operating frequency the ambient temperature is at or above the predetermined threshold temperature. The antenna can be a planar antenna, such as a planar dipole antenna. The planar dipole antenna can comprise an integrated T-match network (ITMN). The antenna can be actuated above the ground plane by the LCE expanding as the predetermined threshold temperature is reached and exceeded, causing the first operating frequency to change to the second operating frequency. The first operating frequency can be, for example 902 MHz and the second operating frequency can be, for example, 928 MHz. The predetermined threshold temperature can be, for example, 160° C. The LCE can comprise a shape memory polymer. The LCE can be a 4D-printed LCE array. The antenna can be a patch antenna comprising a slot; the temperature sensor can further comprise a switch positioned in the slot of the patch antenna; and the temperature sensor can be configured such that the LCE expands or contracts as the temperature changes to cause the switch to engage or disengage to thereby change the first operating frequency to the second operating frequency or the second operating frequency to the first operating frequency.

BRIEF DESCRIPTION OF DRAWINGS

FIG. 2A shows the array in the relaxed state with no heat-stimulus. When a heat-stimulus is applied, each cell forms into a conical shape, as shown in FIG. 2B, and the total array then provides sufficient lifting force to actuate the antenna.

FIG. 14 shows Design B from Table II.

FIG. 20 shows Design B from Table II.

FIG. 25A shows the case of the heat source being activated, such that the LCE raises the RFID antenna by 4 mm at 160° C. FIG. 25B shows the case of the heat source being turned off and returning to room temperature, such that the LCE returns to its original flat state.

DETAILED DESCRIPTION

Figure 1:
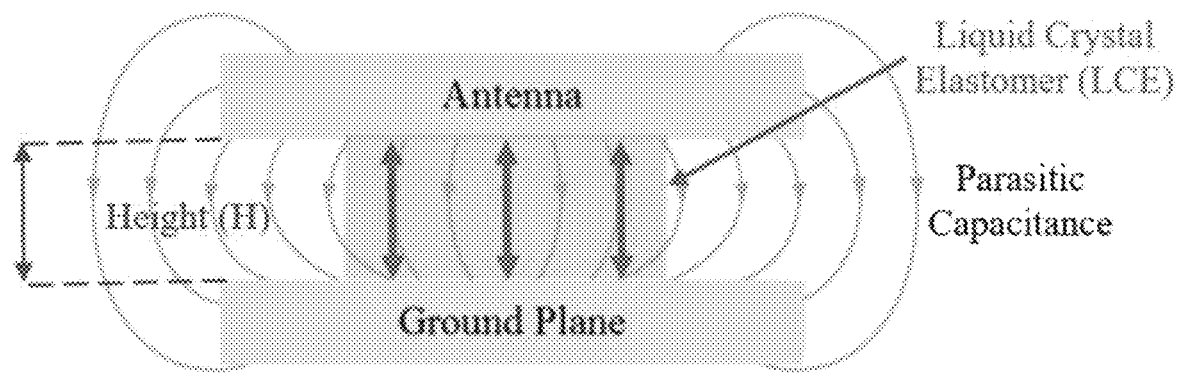
FIG. 1 is schematic view demonstrating the theory of operation of a temperature sensor according to an embodiment of the subject invention.

Embodiments of the subject invention provide novel and advantageous passive (i.e., battery-free) radio frequency identification (RFID) real-time temperature sensors based on programmable liquid crystal elastomers (LCEs), as well as methods of manufacturing and using the same. The sensors can be used for monitoring the temperature for various applications, including but not limited to temperature monitoring of perishable goods, foods, and medicines in the cold supply chain. The sensors convey changes in temperature through, e.g., a controlled shift of the operating frequency in the RFID ultra high frequency (UHF) band. For example, a sensor can switch its operating frequency from a first frequency to a second frequency different from the first frequency (e.g., 902 to 928 megahertz (MHz)) when the temperature reaches a high threshold and it can also automatically switch its operating frequency back to the first frequency (e.g., 902 MHz) when the temperature drops below the threshold (e.g., room temperature). Although 902 MHz and 928 MHZ are given as examples of first and second frequencies herein, this is for exemplary purposes only and should not be construed as limiting.

Embodiments of the subject invention provide an enhanced solution to monitoring perishable goods in the cold supply chain with a sensor that has the capability to monitor individual goods independently and continuously. Additionally, the sensor can have a non-line-of-sight communication link capability and operate using passive technology for cost-effectiveness and longevity. This would mitigate any uncertainties in regards to the integrity and quality of important foods and medicines because temperature readings can be documented at any time and location. RFID technology provides an auspicious platform with a standardized communication protocol that fulfills all the desired sensor attributes mentioned above.

In an embodiment, an RFID passive temperature sensor can self-tune between, for example, 902 MHz and 928 MHz, operating in the RFID UHF band, as the temperature rises or falls beyond a certain threshold. For example, at room temperature the sensor operates at 902 MHz and at an elevated temperature (e.g., 160° C. or approximately 160° C.) the sensor operates at 928 MHz. As the temperature drops back below the threshold (e.g., towards room temperature), the operating frequency of the sensor can automatically re-tune or switch back to 902 MHz. The sensor can comprise a planar dipole antenna with a customized matching network that is placed above a ground plane. The shift in frequency is accomplished by actuating the antenna above the ground plane. A novel, temperature-responsive, 4D-printed LCE can be used for the antenna actuation. The unique property of the LCE is that it changes shape when the temperature is increased and returns to the original relaxed state as the temperature is restored. Moreover, the LCE can be actuated and relaxed through multiple temperature cycles. Hence, the passive sensor can be used to detect multiple temperature threshold violations, as well as multiple returns to normal operating temperatures thereby providing continuous monitoring of goods. Accordingly, because the sensor functions through the exposure of the LCE array to the surrounding elevated temperatures, it is most suitable for the detection of ambient temperature threshold crossings. One application of the sensor is to accompany packages or pallets in the cold-supply-chain to monitor the temperature conditions in cargo transportation containers during the delivery cycle.

Sensors of embodiments of the subject invention can use currently available 4D printed LCE technology with a well-matured fabrication process. Such LCEs react only to elevated temperatures of approximately 160° C. Also, the physics involved in the shifting of the sensor's operating frequency is independent of the temperature. That is, the operating frequency of the sensor only depends on the height of the designed RFID antenna above the ground plane and the only component that is dependent on the temperature is the selected 4D printed LCE array. Therefore, the sensor can be adapted to cold environments by replacing the current 4D printed LCE array with shape-memory polymers or LCEs that react to lower temperatures to provide temperature threshold detection in the cold-supply chain. However, it should also be noted that the unique advantage of LCEs compared to other shape-memory polymers is their ability to operate reversibly and the fact that they are reusable because they are able to go through many high/low temperature dependent actuation cycles. 4D printed heat-responsive LCEs were developed to be used with embodiments of the subject invention.

A sensor was tested to determine if LCEs are a viable choice for dynamic control of antenna structures to detect temperature threshold crossings. Hence, the sensor was studied in a stand-alone-mode (i.e., by itself) to prove its functionality. However, simulation modeling was used to test the performance of the sensor in practical settings. Specifically, the sensor was placed on shipping boxes made of various materials carrying a payload that represents fruits and vegetables. Subsequently, the temperature detection accuracy of the sensor was examined by placing an identical sensor in close proximity at different orientations. To assess the overall performance of the sensor, it was compared to a commercially available RFID temperature sensor. The Freshtime Sensor RFID Classic Tag by Infratab is designed for the same application as the tested sensor of an embodiment of the subject invention, the purpose being to monitor temperature conditions of perishable items in the cold-supply chain. Table I compares useful technical parameters associated with RFID temperature sensors that are intended for temperature monitoring in the cold-supply chain. The "Developed Sensor in this Research" column refers to a sensor according to an embodiment of the subject invention.

Referring to Table I, it is apparent that the sensor of an embodiment of the subject invention provides an improved form of temperature sensing. Specifically, the sensor provides a battery-free (very long lifetime), cost-effective, real-time, and continuous solution for temperature monitoring.

Design of a sensor according to an embodiment of the subject invention will now be discussed below.

For the sensor design, the Alien Higgs III SOT RFID IC was used. The design of the sensor depends on the input impedance of the RFID IC. Moreover, this input impedance is a function of the applied power and frequency of operation. In the design, the input impedance at the minimum power level required for the RFID IC to turn on (i.e., the threshold power) within the RFID operating band of 902-928 MHz was selected. Additionally, this guideline will maximize the read-range capability. The nominal value of $Z_{IC}=18-164j$ was carefully chosen.

TABLE I

PERFORMANCE COMPARISON OF THE DEVELOPED SENSOR

| Parameter | Developed Sensor in this Research | Freshtime Sensor RFID Classic Tag by Infratab |
|---|---|---|
| Technology | Passive (Batter-free) | Semi-Passive (manufacturer battery replacement required/yr.) |
| Information Delivery | Frequency Domain | Coded Data Stream |
| Tracking Domain | Real-time | Data-logger |
| Sensing Functionality | Dynamic antenna control LCE technology | Seperate temperature IC sensor |
| Frequency of Operation (MHz) | 905 and 928 | 860-960 |
| Max Range (m) | 1.4 | 7 |
| Temperature Range | 22° C. and 160° C. (Adaptable to cold) | −30° C. to +70° C. |

The frequency self-shifting operation of the sensor is accomplished through the physical design of the sensor. A planar antenna was designed with a customized matching network on a FR4 substrate. This antenna is then placed above a ground plane at a height, H, as shown in FIG. 1. The ground plane induces a parasitic capacitance. The relation of the parasitic capacitance to the operating frequency of the developed sensor follows the equation for the resonant frequency of an LC circuit and is given by:

$$f_{res} = \frac{1}{2\pi\sqrt{LC}} \quad (1)$$

where L represents the equivalent inductance of the dipole and C represents the equivalent capacitance plus the induced parasitic capacitance due to the presence of the ground plane.

Accordingly, the parasitic capacitance is inversely proportional to the height of the antenna above the ground plane analogous to that of a parallel plate capacitor. Also, the parasitic capacitance is inversely proportional to the operating frequency of the sensor. Thus, the height is directly proportional to the operating frequency.

Further, the height between the antenna and the ground plane is controlled by an LCE support which is temperature dependent (see FIG. 1). Hence, the operating frequency of the sensor depends on the temperature.

The next design step can include determining an appropriate matching network to provide a conjugate match between the antenna and the RFID IC for maximum power transfer. The T-match and the inductively coupled loop are two common methods for matching of RFID antennas.

However, the design configurations for these impedance matching methods incorporate feeding loops with permanent physical dimensions. Due to the profound influence of the ground plane, these dimensions would need to be altered as the height, H, changes. Hence, these impedance matching methods impose excessive complexity and are not suitable for the design. For this reason, an innovative Integrated T-Match Network (ITMN) is utilized. The ITMN includes embedding the classical T-match Network (TMN) within the planar dipole antenna structure. Further, the ITMN is a good impedance matching method as it has only four design parameters. The heights, H, at which the desired frequency shifts must occur and the detailed design of the matching network are discussed later.

LCEs are stimuli responsive polymers. The nematic LCE used here includes molecules that have orientational order. As heat is applied, the material undergoes a phase transition, and the LCE contracts along the nematic director. As a result, the direction of the thermomechanical response of the LCE is controlled by the orientation of the nematic director. Thus, by controlling the molecular orientation of the LCE, materials that undergo a variety of shape changes can be obtained. In this application, the significant advantage of the LCE, as compared to shape memory polymers, is that the material returns to its original state after the heat stimulus has been removed without any physical intervention.

Figures 2A, 2B:
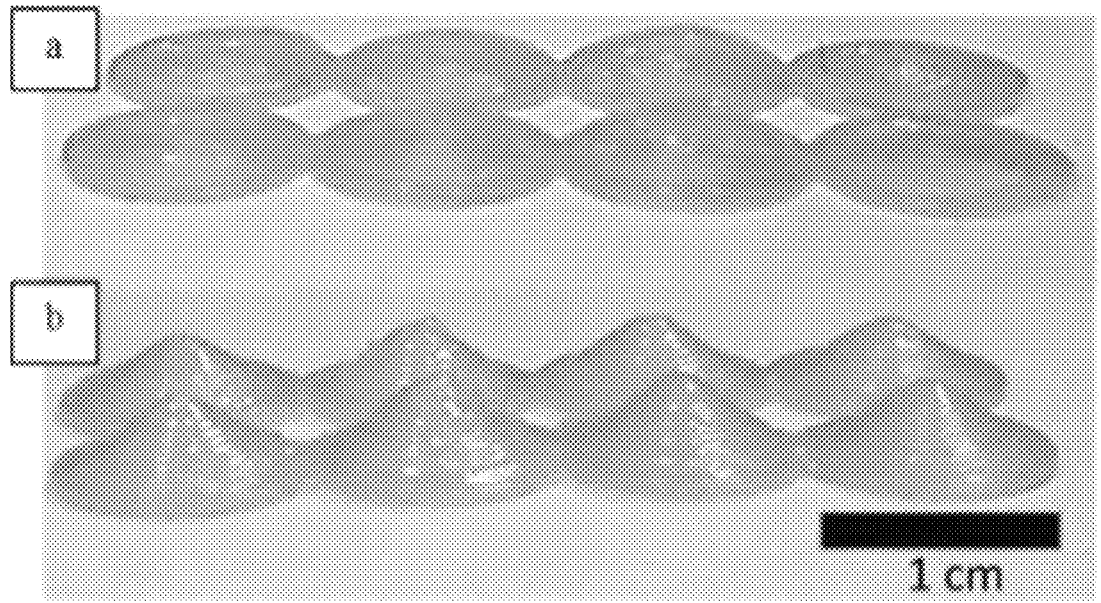
FIGS. 2A and 2B are images of a four-dimensional (4D) LCE 4×2 array with Archimedean chord cells printed with controlled molecular orientation.

A four-dimensional (4D) printed structure is a three-dimensional printed structure that is capable of reversibly changing shape due to a stimulus. Here, LCE structures are printed with controlled molecular orientation, as shown in FIG. 2A. The molecular order is programmed by controlling the print path. Therefore, by controlling the print path, 3D structures with a reversible stimulus response can be fabricated with customized geometries. Further, LCEs printed on non-uniaxial print paths within a plane undergo complex deformation on heating. Specifically, directing the print path along an Archimedean chord pattern results in an LCE film programmed with the nematic director that varies azimuthally around a single point, similar to the director pattern that is observed in a +1 topological defect. As a result, this single point is actuated in the direction normal to the resting plane as heat is applied. For the application in this research, to maximize the lifting capacity, a 4×2 array of Archimedean chord cells was fabricated. The array is reversible depending on the applied temperature and is displayed in the relaxed and excited states in FIGS. 2A and 2B, respectively.

Figure 3:
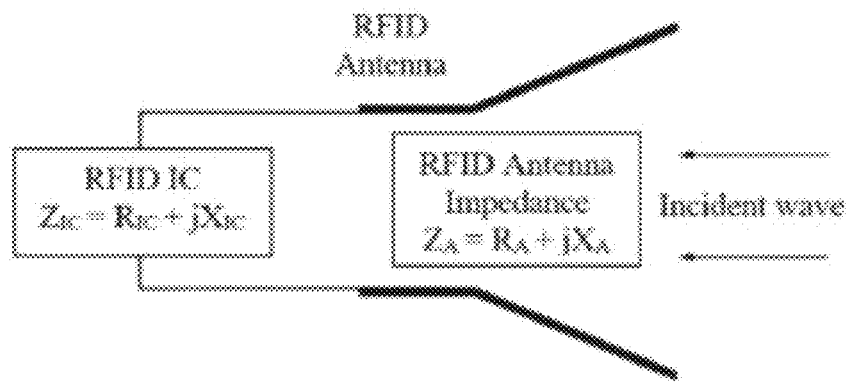
FIG. 3 shows a schematic of an RFID tag antenna with complex input impedance $Z_A$ terminated to a RFID integrated circuit (IC) with complex input impedance $Z_{IC}$ in the receiving mode.

The Friis transmission equation describes the power received ($P_r$) by an antenna due to a transmitting antenna at a distance, d, in the far-field and is given by:

$$P_r = (P_t G_t A_r)(4\pi d^2) \quad (2)$$

where $P_t$ is the transmitted power, $G_t$ is the gain of the transmitting antenna, and $A_r$ is the effective aperture of the receiving antenna. The schematic of an RFID antenna (in the receiving mode) terminated by an RFID IC is depicted in FIG. 3. The impedances for the RFID antenna and the RFID IC are defined; respectively, as:

$$Z_A = R_A + jX_A \quad (3)$$

$$Z_{IC} = R_{IC} + jX_{IC} \quad (4)$$

Further, the power wave reflection coefficient between the antenna and the IC is expressed as:

$$\Gamma = \frac{Z_A - Z_{IC}^*}{Z_A + Z_{IC}} \quad (5)$$

Consequently, the Power Transmission Coefficient (PTC; τ) is then specified as:

$$\tau = 1 - |\Gamma|^2 \quad (6)$$

Substituting (3), (4), and (5), into (6) brings the PTC to the following form:

$$\tau = \frac{4 R_A R_{IC}}{|Z_A + Z_{IC}|^2} \quad (7)$$

Finally, after combining (2) and (7), an expression for the power received by the IC from a transmitting antenna is written as:

$$P_{chip} = (P_t G_r A_r \tau)/(4\pi d^2) \quad (8)$$

Hence, (7) is significant as it describes the degree of matching between the antenna and the IC, where $0 \le \tau \le 1$. In the case when $\tau=1$, a conjugate match ($z_A = z^*_{IC}$) is obtained that provides maximum power transfer to the IC. It is desirable to design the antenna with a matching network in such a way as to achieve a transmission power coefficient close to 1. For this reason, τ (as given by (7)) is used as a figure of merit for the sensor's performance.

Commercially available RFID tags employ antennas with matching networks that include a variety of customized complex geometries. In other words, there is no standardized procedure for designing RFID antennas. In contrast, the planar RFID antenna with the ITMN proposed here is advantageous, as it requires only four dimensions to be optimized. Accordingly, these dimensions are L, W, $W_1$, and s, referring to FIG. 4. Also, in the design, t can be set to 1 mm (as a non-limiting example), which provides a favorable distance at the input/output port for the RFID IC pins to make contact. Using the classical TMN as a basis model, design equations and a procedure to determine the design dimensions: L, W, $W_1$, and s can be developed.

The TMN is an established impedance matching method for dipole antennas. It incorporates a secondary branch of conductors with a small spacing, x, from an ordinary dipole antenna; without any matching network. By adjusting the spacing, x, the length, l', and radius, a', of these conductors, a favorable match can be obtained at the input/output port, referring to FIG. 5.

Due to the geometrical asymmetry between the ordinary unmatched dipole and the conductors in the secondary branch, e.g., a≠a' and l≠l', the current at the input is not uniformly divided among the two branches. To account for this non-uniform current distribution, the current division factor, α, based on the geometry is introduced:

$$\alpha = \frac{\ln\left(\frac{x}{a'}\right)}{\ln\left(\frac{x}{a'}\right) - \ln\left(\frac{a}{a'}\right)} \quad (9)$$

Figure 5:
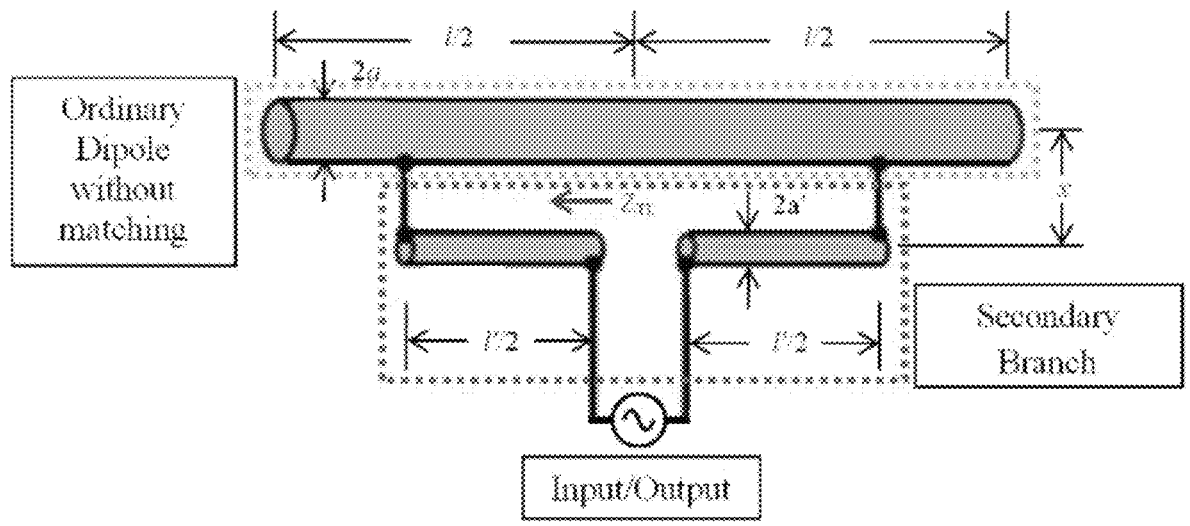
FIG. 5 is a schematic view of a secondary branch of conductors added to an unmatched dipole to achieve an impedance match at the input port by adjusting the dimensions x, l', and a'.
Figure 6:
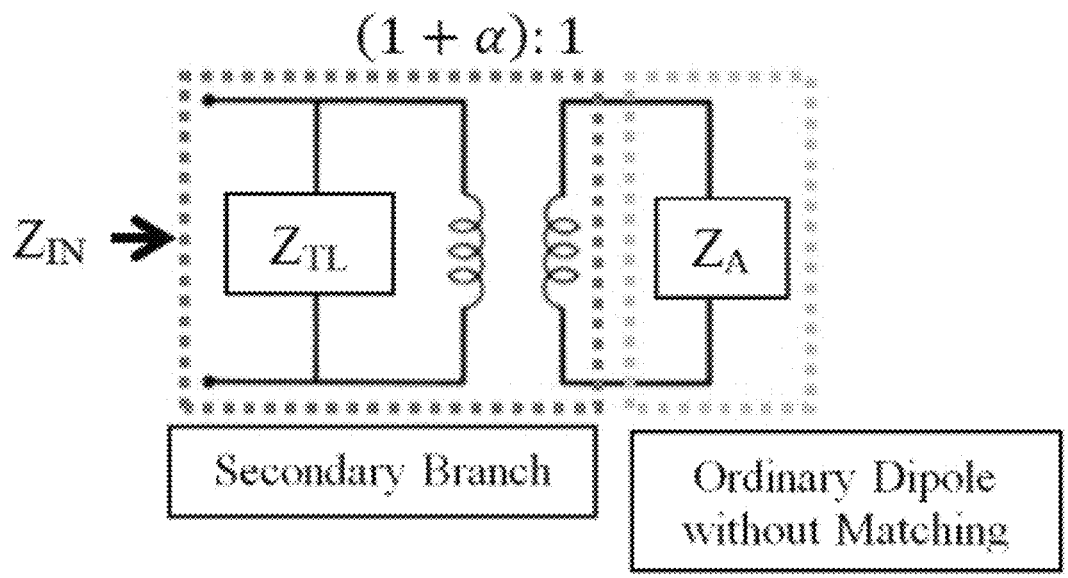
FIG. 6 is a schematic view of a transformer model of the T-match network of FIG. 5. It is evident that the input impedance is dependent on the current division factor, α. Also, α depends on the geometry of the secondary branch.

Further, the TMN in FIG. 5 is conveniently interpreted through the transformer model in FIG. 6. In this case, $Z_A$ is the input impedance of the ordinary dipole antenna without any matching network and $Z_{TL}$ is the shunted transmission line mode impedance (see FIG. 5). It is apparent from FIG. 6 that the input impedance is a function of α. Hence, by adjusting the geometry of the secondary branch (i.e., x, l', and a), α is modified, and one can achieve the desired impedance match at the input port. In the planar dipole antenna design, this impedance matching method will be used.

A formula, which expresses the current division factor in terms of the planar antenna and RFID IC impedances, is derived and its correlation to the antenna geometry is identified. The input impedance, $Z_{IN}$, of the TMN from FIG. 6, is written as:

$$Z_{IN} = R_{IN} + jX_{IN} = \frac{2 Z_{TL}[(1+\alpha)^2 Z_A]}{2 Z_{TL} + (1+\alpha)^2 Z_A} \quad (10)$$

To achieve maximum power gain, $Z_{IN}$ should be matched to the complex conjugate of the input impedance of the RFID IC, that is:

$$Z_{IN} = Z_{IC}^* = R_{IC} - jX_{IC} \quad (11)$$

Moreover, the transmission line mode impedance, $Z_{TL}$, is essentially a shorted transmission line, referring to FIG. 5. Hence, the impedance $Z_{TL}$ is purely imaginary, or $Z_{TL} = jX_{TL}$. By substituting this transmission line mode impedance and (3) into (10) and setting it equal to (11), the following expression is obtained:

$$Z_{IN} = \frac{2jX_D[(1+\alpha)^2(R_A + jX_A)]}{2jX_D + (1+\alpha)^2(R_A + jX_A)} = R_{IC} - jX_{IC} \quad (12)$$

Further, after equating the real parts and solving for α, the following design equation is obtained:

$$\alpha = \frac{R_A^2 R_{IC} + R_{IC} X_A^2 - \sqrt{(R_A R_{IC}(R_A^2 + X_A^2)(R_{IC}^2 + X_{IC}^2))}}{R_{IC} R_A^2 + R_{IC} X_A^2} \quad (13)$$

$$= \sqrt{\frac{R_A(R_{IC}^2 + X_{IC}^2)}{R_{IC}(R_A^2 + X_A^2)}} - 1$$

Equation (13) shows that α is a function of the complex impedances of the RFID IC and planar antenna. Moreover, this equation implicitly shows that α depends on the geometry of the planar antenna. This geometrical relation will be utilized later to determine the length, L, and width, W, (see FIG. 4) of the planar antenna design using simulation.

Figure 4:
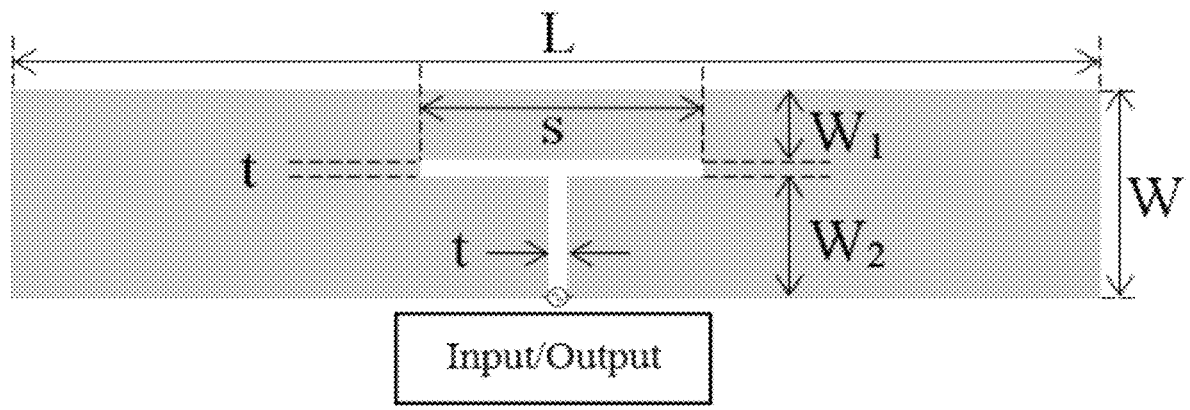
FIG. 4 is a schematic view of a planar dipole with an integrated T-match network (ITMN).
Figure 7:
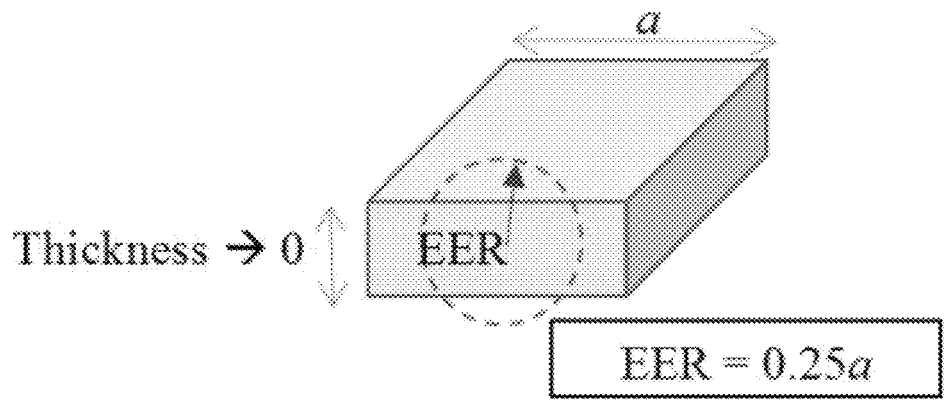
FIG. 7 shows the electrical equivalent radius (EER) of a flat planar conductor.

The remaining design equation that will determine the width $W_1$ (see FIG. 4) can now be derived. It should be pointed out that (9) assumes cylindrical conductors are used, as shown in FIG. 5. However, the planar antenna with the ITMN in FIG. 4 is designed using flat planar conductors. To correctly approximate the antenna characteristics using conductors of flat cross section, an equivalent circular conductor must replace the noncircular cross section of the flat planar conductors. This is accomplished by utilizing the Electrical Equivalent Radius (EER) as depicted in FIG. 7, where a represents the width of the flat conductor.

Figure 8:
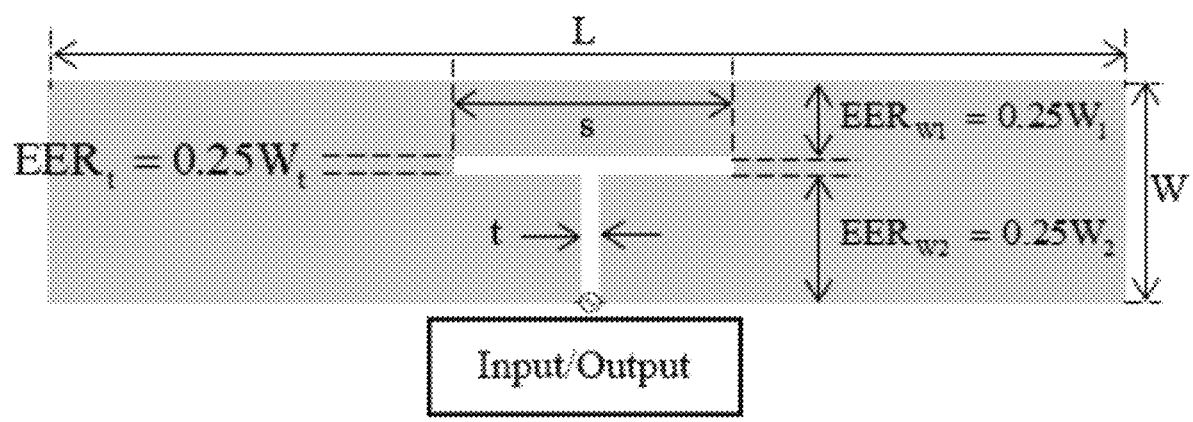
FIG. 8 is a schematic view of a planar antenna design with the ITMN and the EERs defined for the flat conductors.

Moreover, in FIG. 8, the antenna width, W, includes three sections of flat conductors. Each conductor is defined using the EER and are labelled as: $EER_{W1}$, $EER_t$, and $EER_{W2}$. The EER is based on the physical dimensions of the flat conductor as depicted in FIG. 7.

Based on FIG. 5, when calculating the dimension x, the EER of the center spacing in FIG. 8 is doubled, i.e., 2EER$_t$, because the EER represents equivalent radius and not the diameter. Then, to adapt (9) to the planar antenna design, the EERs of the flat planar conductors, as shown in FIG. 8, are incorporated into the ratios: x/a' and a/a'. After further simplifying, the following expressions are obtained:

$$\frac{x}{a'} = \frac{EER_{W1} + 2EER_t + EER_{W2}}{EER_{W2}} = \frac{W_1 + 2t + W_2}{W_2} \quad (14)$$

$$\frac{a}{a'} = \frac{EER_{W1}}{EER_{W2}} = \frac{W_1}{W_2} \quad (15)$$

Subsequently, by substituting (14) and (15) into (9), the current division factor for the planar antenna model of FIG. 8 is written as:

$$\alpha = \ln\left(\frac{W_1 + 2t + W_2}{W_2}\right) \Big/ \left(\ln\left(\frac{W_1 + 2t + W_2}{W_2}\right) - \ln\left(\frac{W_1}{W_2}\right)\right) \quad (16)$$

Further, the width, W, in FIG. 4 is defined by the equation: $W=W_1+t+W_2$. Because t is significantly smaller than the dimensions $W_1$ and $W_2$, we can use the following expression, with minimal error, for the width, $W=W_1+2t+W_2$. This substitution is necessary to format equation (16) in such a way as to provide a simplified and concise expression for the upper width, $W_1$, (see FIG. 4). Substituting this approximation in (16) yields the following:

$$\alpha = \ln\left(\frac{W}{W_2}\right) \Big/ \left(\ln\left(\frac{W}{W_2}\right) - \ln\left(\frac{W_1}{W_2}\right)\right) \quad (17)$$

Equation (17) can be solved for $W_1$:

$$W_1 = \left(W\left(\frac{W_2}{W}\right)^{\frac{1}{\alpha}}\right) \quad (18)$$

Moreover, dimension $W_2$ controls the vertical positioning of the integrated T-match network (see FIG. 4). For a practical design and to further simplify (18) to a function of only one variable, it is assumed that $W_2$ is equal to half the width of the antenna, W, i.e., $W_2=W/2$. Also, we assume that $W_1$ is an integer to allow for rapid and easy prototyping. Based on these two assumptions, (18) is written as:

$$W_1 = \text{integer}\left(W\left(\frac{1}{2}\right)^{\frac{1}{\alpha}}\right) \quad (19)$$

Finally, from FIG. 4:

$$W_2 = W - t - W_1 \quad (20)$$

and as mentioned earlier in this section, t can be set to 1 mm. Equations (13), (19), and (20) will be used as design equations for the planar dipole antenna with the ITMN. The design process according to an embodiment will be detailed now. The design process described includes certain materials, dimensions, operating frequencies, etc., but these are only given/used for exemplary purposes and should not be construed as limiting.

Figure 9:
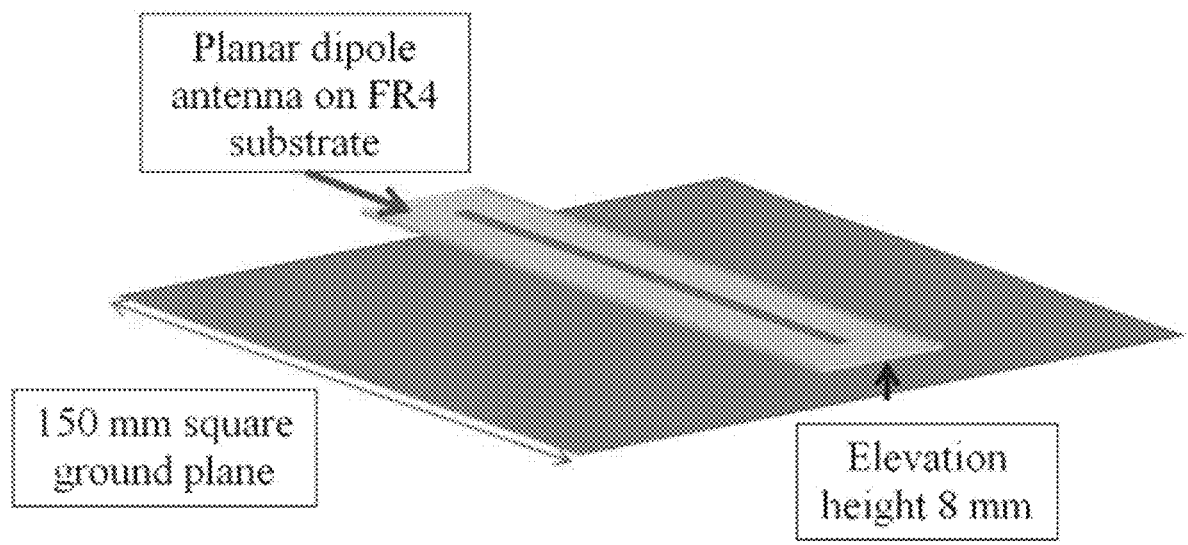
FIG. 9 is a schematic view of ANSYS HFSS simulation model of a planar dipole antenna design on an FR4 (a composite material comprising woven fiberglass cloth with an epoxy resin binder that is flame resistant) substrate over the ground plane.

First, an ordinary planar dipole at 928 MHz is designed using FR4 substrate. The planar antenna is then placed above a 150 mm square ground plane at a height of 8 mm. The FR4 substrate provides a firm support for the RFID IC, which improves the structural integrity of this tag. The design model is shown in FIG. 9.

Then, the width, W, is varied from 10 mm to 60 mm in intervals of 10 mm. Further, the length, L, is swept from 80 mm to 180 mm. For each antenna width, W, the antenna input impedance is simulated as the length, L, is swept. Equation (13) is then applied to the simulated input impedances to calculate the current division factor, α, which is depicted in FIG. 10.

TABLE II

| Design | W (mm) | L (mm) | α | $W_1$ (mm) | $W_2$ (mm) | s (mm) | Heights 902 MHz 928 MHz |
|---|---|---|---|---|---|---|---|
| A | 10 | 120 | 0.55 | 2 | 7 | 9.8 | 3.6 mm 7.2 mm |
| B | 20 | 120 | 0.74 | 7 | 12 | 9.4 | 3.6 mm 6.8 mm |
| C | 30 | 120 | 1.23 | 17 | 12 | 17.7 | 2.8 min 6.8 mm |

Figure 10:
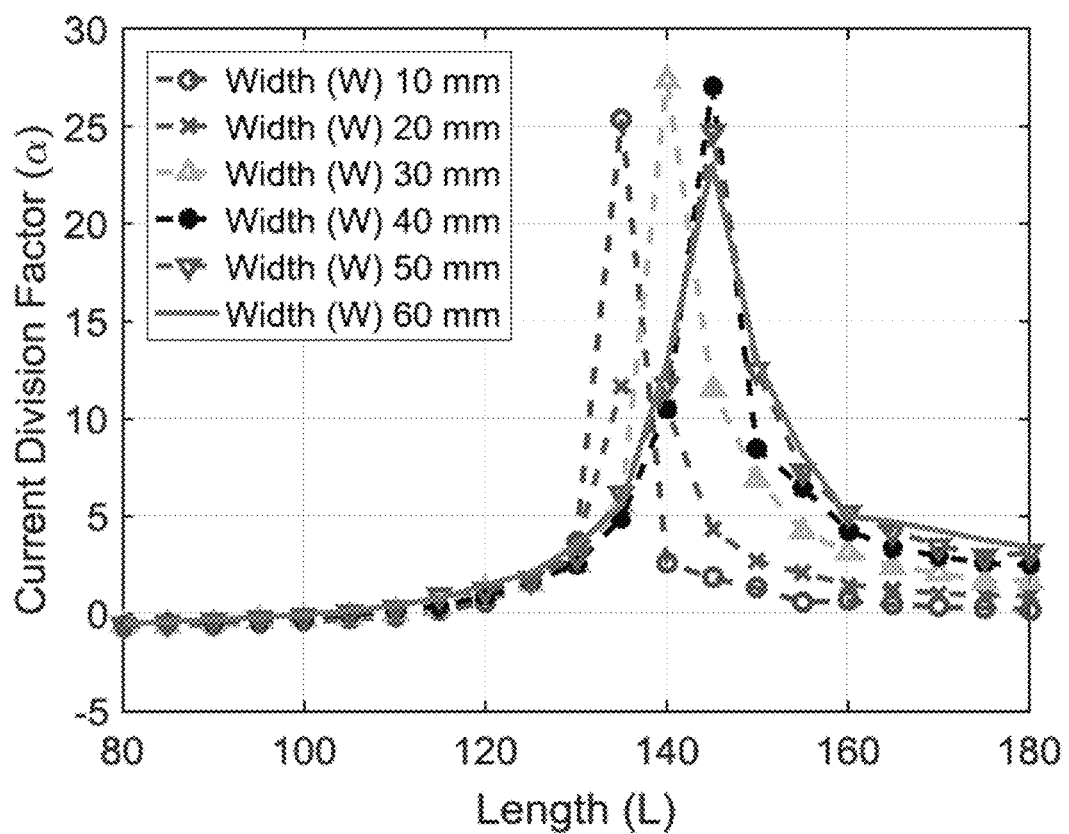
FIG. 10 is a plot of current division factor (a) versus dipole length (L) for different dipole widths (W).

Theoretically, any point on a curve in FIG. 10 represents a solution combination of α, W, and L for the planar antenna design depicted in FIG. 4. Accordingly, the combination of α and W at the length (L) of 120 mm reveal design values that are favorable for fabrication. Also, only the three smallest widths of 10 mm, 20 mm, and 30 mm are considered as they provide designs with the smallest weight. The parameters W, L, and α are selected from FIG. 10 for the three designs (A, B, and C) and are listed in Table II below.

Subsequently, (19) and (20) are now utilized to find the widths $W_1$ and $W_2$, respectively, for each of the selected designs. The widths $W_1$ and $W_2$ are shown in Table II.

Figure 11:
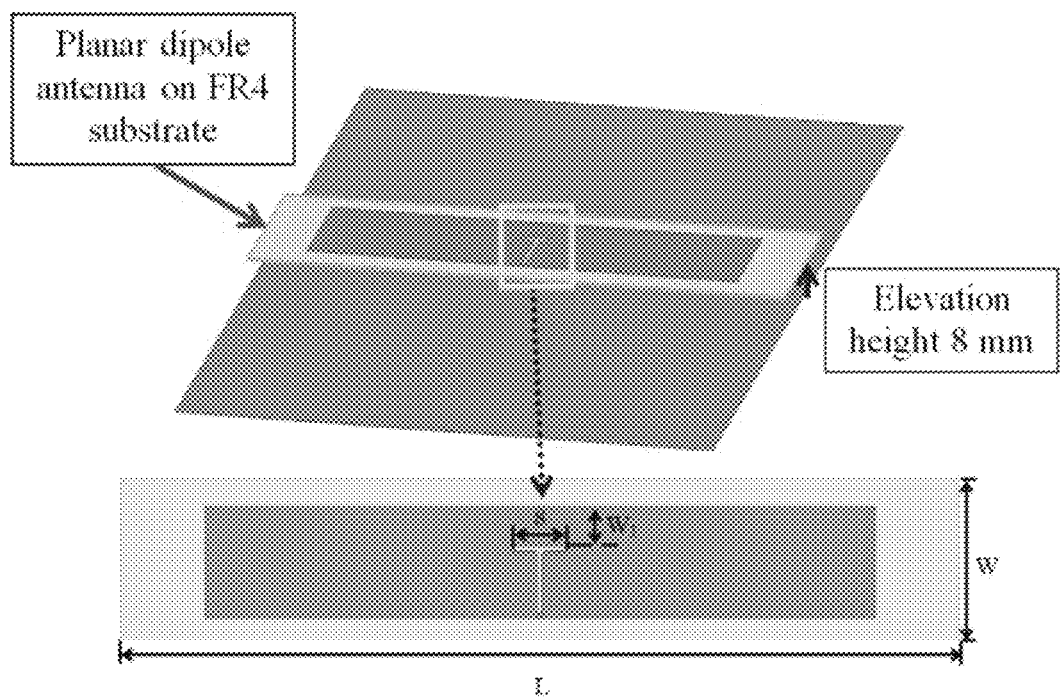
FIG. 11 is a schematic view of ANSYS HFSS simulation model of a planar antenna design with the ITMN.

At this point, all the design dimensions have been determined except for the length, s. To determine this length, each design in Table II is modeled (in simulation) individually as shown in FIG. 11. Further, each design is placed 8 mm above the ground plane. Finally, the length, s, is then swept until the operating frequency of the antenna is 930 MHz. Table II summarizes these results.

As discussed above, when the planar antenna decreases its height from the ground plane, its operating frequency decreases as well. Therefore, operating at 930 MHz at a height of 8 mm serves as a starting point. Accordingly, the antenna is then lowered incrementally to find the correct operating heights that correspond to the operating frequencies of 902 MHz and 928 MHz, referring to Table II.

It is important to keep in mind that this sensor conveys temperature threshold crossings in the frequency domain. For that reason, the sensor is designed to have the largest change in operating frequencies so as to make it easily discernable to the operator that a temperature threshold has been crossed. Hence, the lowest and highest possible design frequencies within the RFID UHF band can be utilized; that is, 902 MHz and 928 MHz, respectively, can be used.

Figure 12:
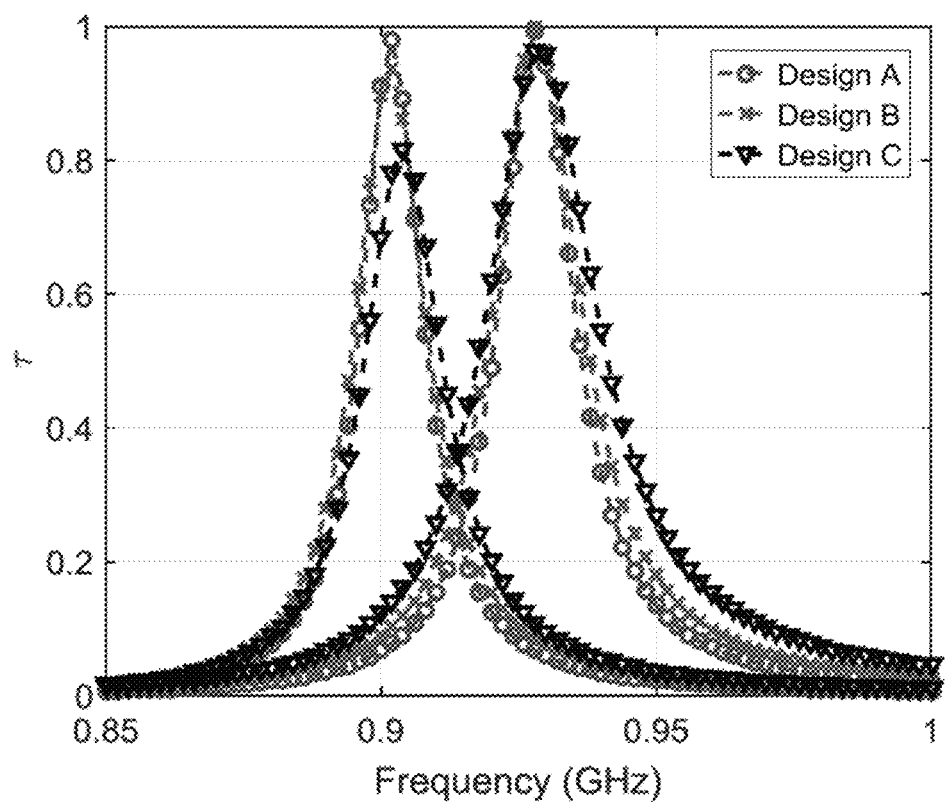
FIG. 12 is a plot of power transmission coefficient (PTC, represented by τ) versus frequency (in gigahertz (GHz) for Designs A, B, and C from Table II. This plot depicts the performance of each design at the two operating frequencies of 902 MHz and 928 MHz.

The optimal design for fabrication, from Table II, can be investigated. The level of performance of each design is determined using the PTC, τ, as discussed above. The PTC is plotted for each design using (7) in FIG. 12. It is apparent that the PTC is at its maximum at the two intended operating frequencies of 902 MHz and 928 MHz, which correspond to the lower and higher elevation heights above the ground plane, respectively. Also, it can be concluded that Designs A and B exhibit better performance than Design C as their PTC is larger at the two operating frequencies.

Designs A and B are comparable in terms of their PTC performance. In contrast, these two designs differ in the heights required to operate at 928 MHz. That is, from Table II, Design A requires an actuation of 3.6 mm (7.2 mm-3.6 mm) and Design B requires an actuation of 3.2 mm (6.8 mm-3.6 mm). This means that Design B requires a smaller amount of actuation to transition between the two operating frequencies of 902 MHz and 928 MHz. Thus, the smaller height difference of design B requires the application of less heat stimulus, which extends the life of the LCE actuator by avoiding overheating and/or overstretching. For this reason, Design B is selected for fabrication in this research.

Figure 13:
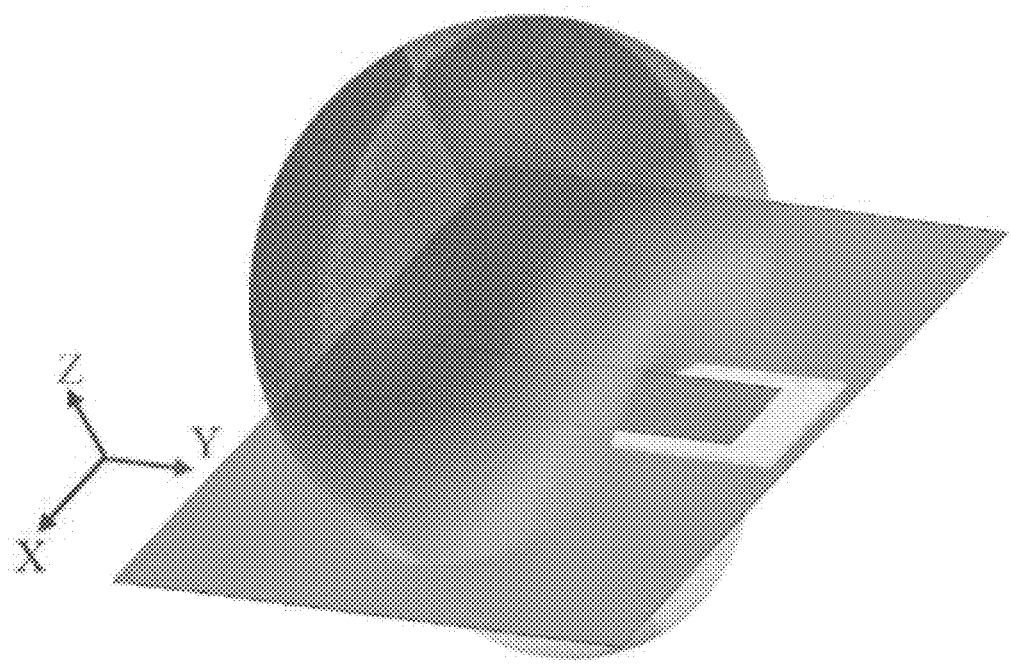
FIG. 13 is an HFSS model of the three-dimensional (3D) radiation pattern of a sensor of an embodiment of the subject invention. The radiation pattern and maximum gain are similar for both cases when the antenna is elevated above the ground plane to 3.6 mm (operating at 902 MHz) and when antenna is elevated to 6.8 mm above the ground plane (operating at 928 MHz).

The radiation performance of the sensor was investigated. The radiation pattern and the gain of the sensor are similar for the two cases where the designed antenna is 3.6 mm (operating at 902 MHz) above the ground plane and where the designed antenna is 6.8 mm (operating at 928 MHz) above the ground. The radiation pattern resembles that of a basic dipole; however, the radiation is directed towards the antenna side (due to the presence of the ground plane behaving as a reflector) where the maximum gain is 3.7 dB in both cases. The 3D radiation pattern is shown in FIG. 13.

Figure 14:
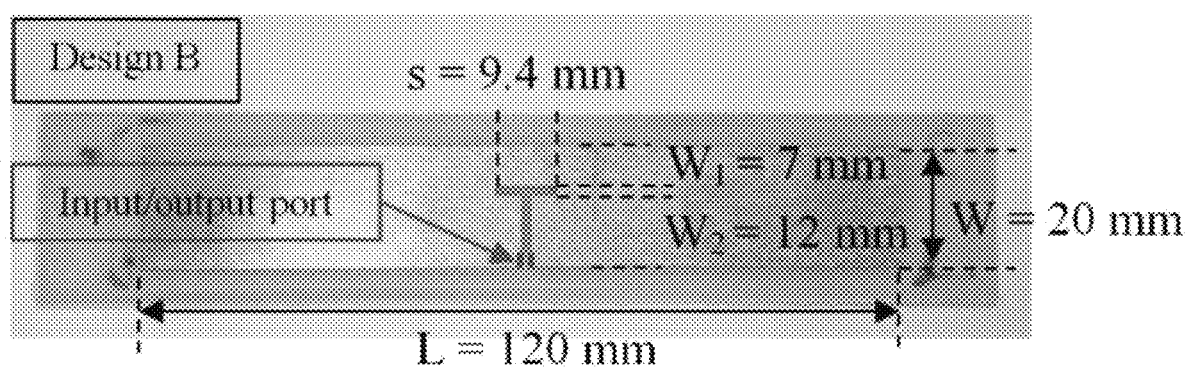
FIG. 14 is an image of a planar antenna design with ITMN, according to an embodiment of the subject invention.

Design B was fabricated using an LPKF S103 micro-milling machine. The prototype is depicted in FIG. 14. The impedance of this antenna needs to be measured without the IC in order to validate our simulation results and the design methodology. This measurement is accomplished by using a customized differential probe or test fixture in a procedure that will be discussed below.

A coaxial cable is a convenient type of transmission line that is commonly used to take RF measurements. However, due to its asymmetry (i.e., having non-identical inner and outer conductors), a coaxial cable is an unbalanced transmission line. Therefore, when a coax cable is connected to a balanced antenna (e.g., a dipole), a net current flows to the ground on the outer surface of the outer conductor. Thus, the input impedance of the dipole, FIG. 14, cannot be measured through a standard measurement of the $S_{11}$.

As discussed, the solution is to bisect the input/output port (see FIG. 14) into two individual ports with reference to a newly introduced common ground. The impedance is then derived based on the differential voltage between the two ports of the network and is correlated to the equivalent two-port scattering parameters. To introduce a common ground and perform the full two-port measurement, a customized test fixture is fabricated.

The test fixture is fabricated by shorting the outer conductors of two coaxial cables and leaving the inner conductors untouched in an open circuit formation. The shorted outer conductors serve as the common ground between the two inner conductors of the cables. Further, the Keysight E5061B Vector Analyzer is used to perform the measurements. A standardized calibration kit is used to align the reference plane from the ports of the VNA to the end of the coaxial test cables. However, this calibration process cannot electrically account for the test fixture. To resolve this, the E5061B offers an Auto Port Extension capability to account for the electrical length of the test fixture.

Figure 15:
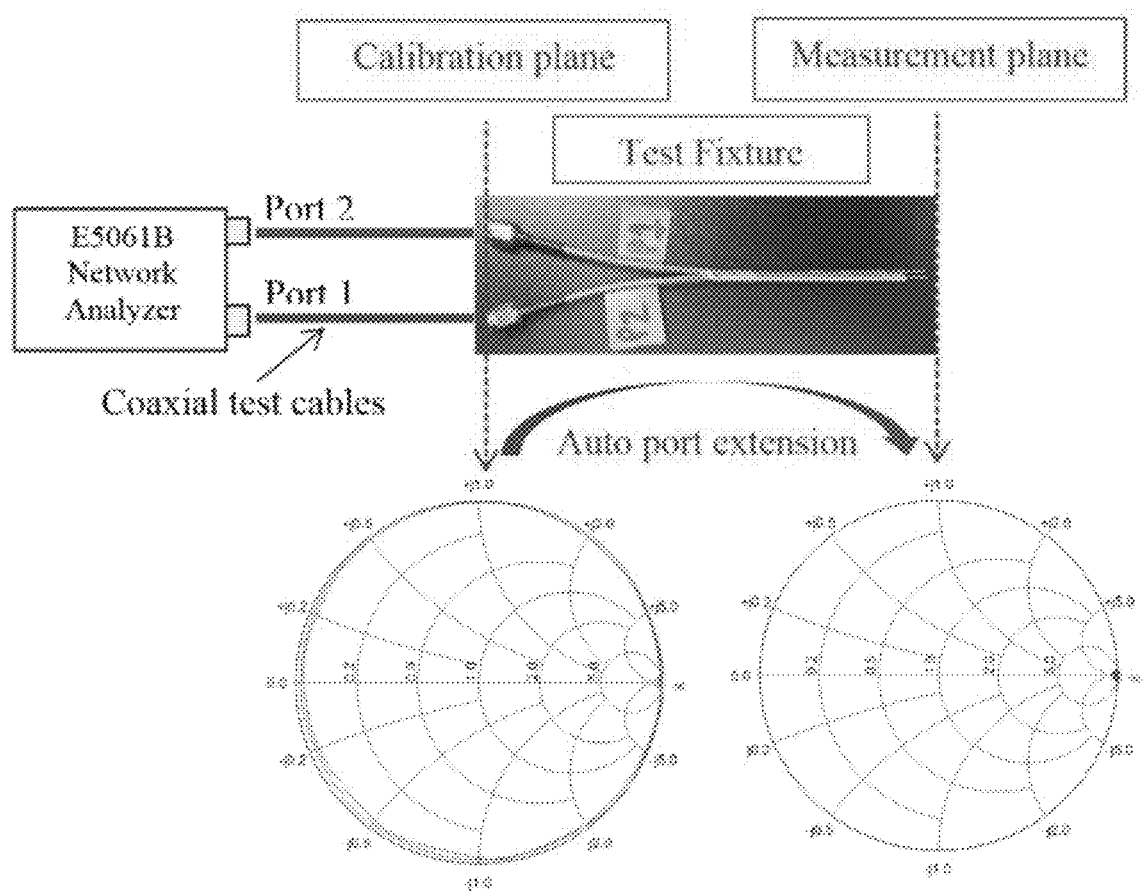
FIG. 15 shows a fabricated input impedance test fixture and calibration process.
Figure 16:
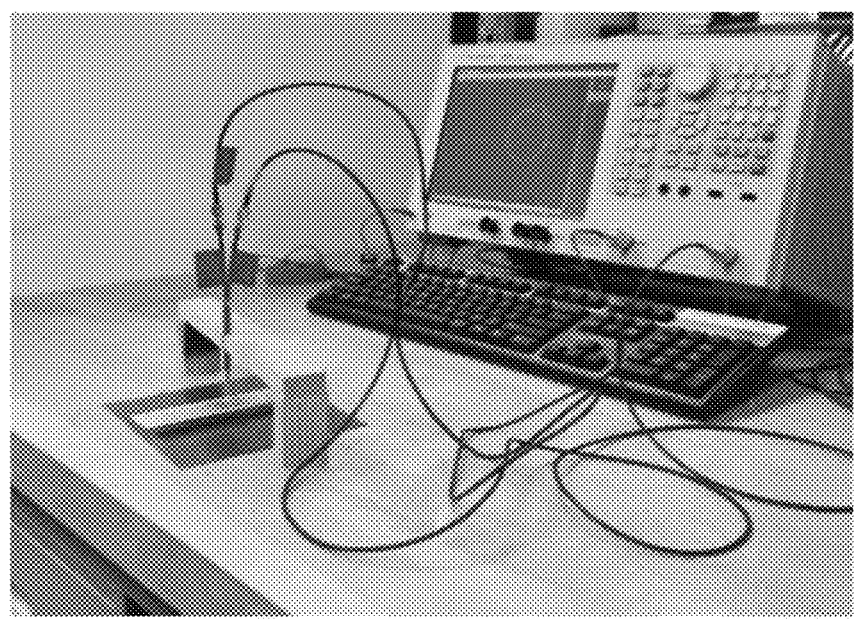
FIG. 16 is an image showing an impedance measurement setup with a test fixture and a VNA.

The test fixture and the calibration process are shown in FIG. 15. Once the VNA is calibrated, the test fixture is attached and the response is depicted in the left Smith Chart in FIG. 15. Once the VNA runs the auto port extension of the open-circuited test fixture, the corresponding open-circuited response in the right Smith chart in FIG. 15 is obtained. After completing this step, the instrumentation is fully calibrated and the effects of the test fixture have been corrected. Subsequently, the planar dipole antenna of FIG. 14 is soldered at the "input/output" port to the inner conductors of test fixture. The full two-port S-parameters are then taken at the two heights corresponding to the two operating frequencies 902 MHz and 928 MHz of Design B in Table II. The test setup is depicted in FIG. 16.

Once the data is collected, the complex input impedance of the balanced antenna is determined from the measured scattering parameters as follows:

$$Z_{in} = \frac{2Z_0(1 - S_{11}S_{22} + S_{12}S_{21} - S_{12} - S_{21})}{(1 - S_{11})(1 - S_{22}) - S_{21}S_{12}} \quad (21)$$

Figure 17:
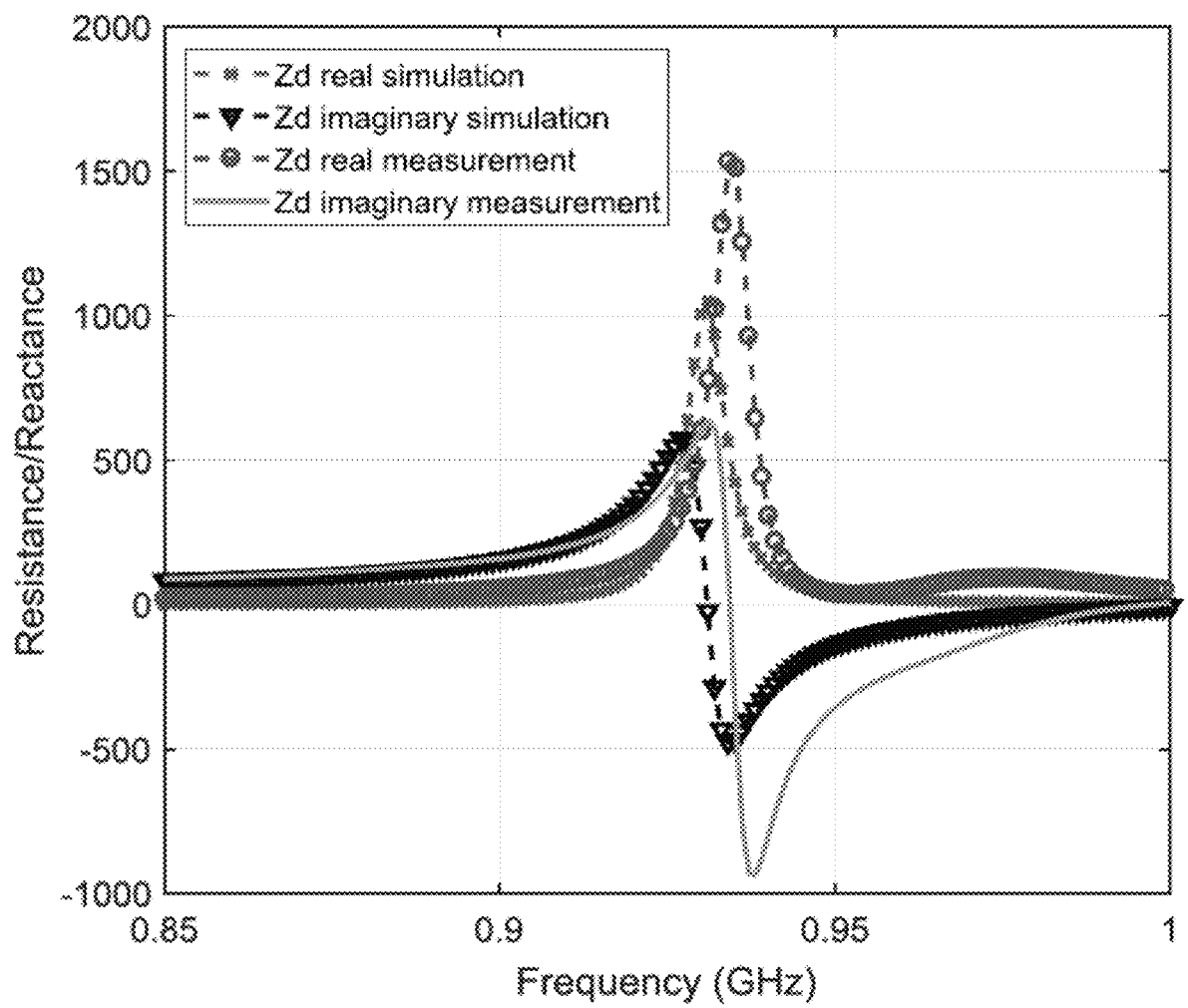
FIG. 17 is a plot of resistance/reactance versus frequency (in GHz), showing the simulated and measured complex input impedances when the elevation of the planar dipole is 3.6 millimeters (mm) above the ground plane. This elevation corresponds to the operating frequency of 902 MHz.
Figure 18:
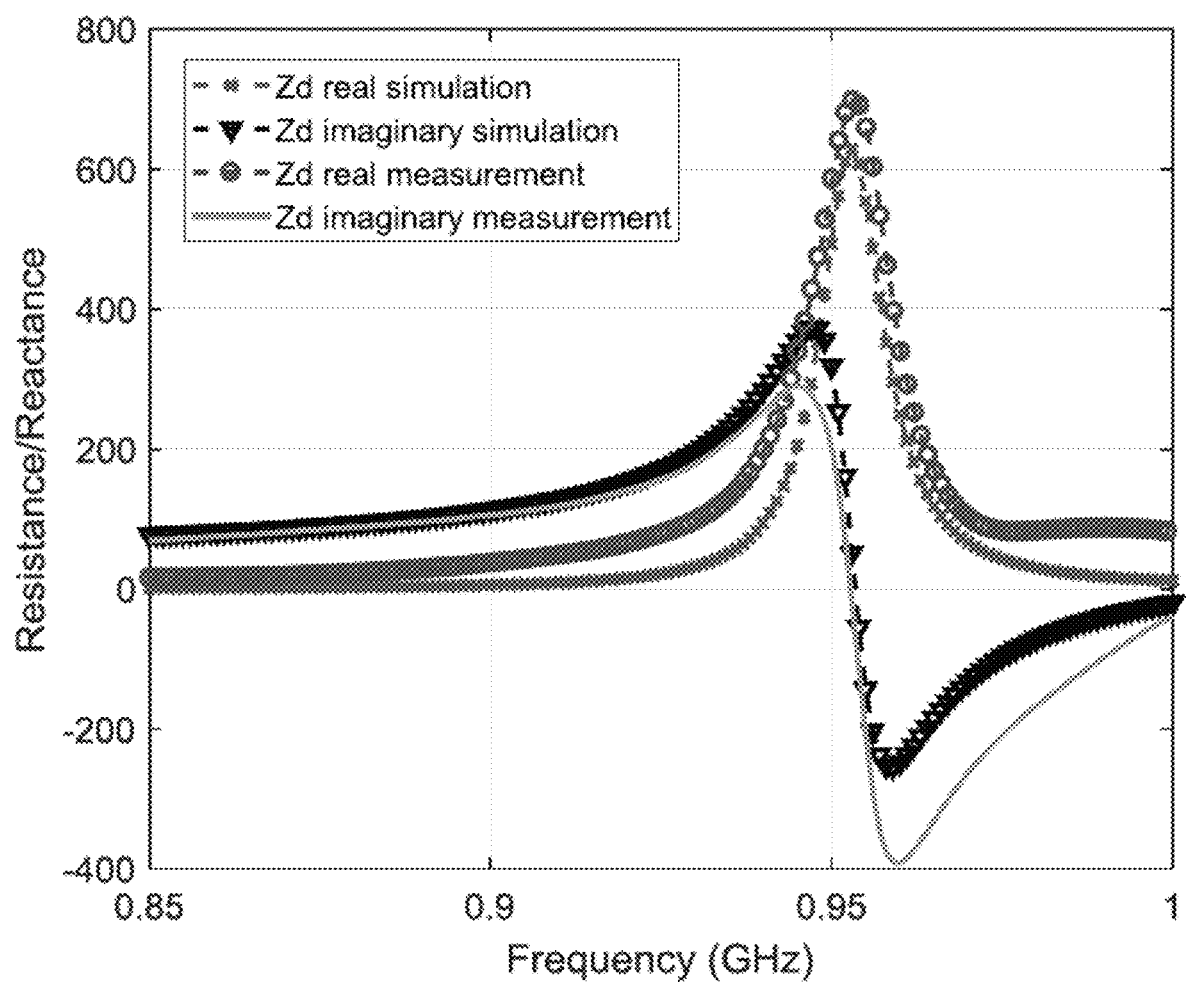
FIG. 18 is a plot of resistance/reactance versus frequency (in GHz), showing the simulated and measured complex input impedances when the elevation of the planar dipole is 6.8 mm above the ground plane. This elevation corresponds to the operating frequency of 928 MHz.

Then, the measured and simulated complex input impedances are compared in FIGS. 17 and 18 for the heights of 3.6 mm and 6.8 mm which correspond to the operating frequencies of 902 MHz and 928 MHz, respectively. The simulated and measured data agree well. The small discrepancy between them occurs because of the parasitic fields induced by the metallic test fixture near the ground plane, which is not included in the simulation.

Figure 19:
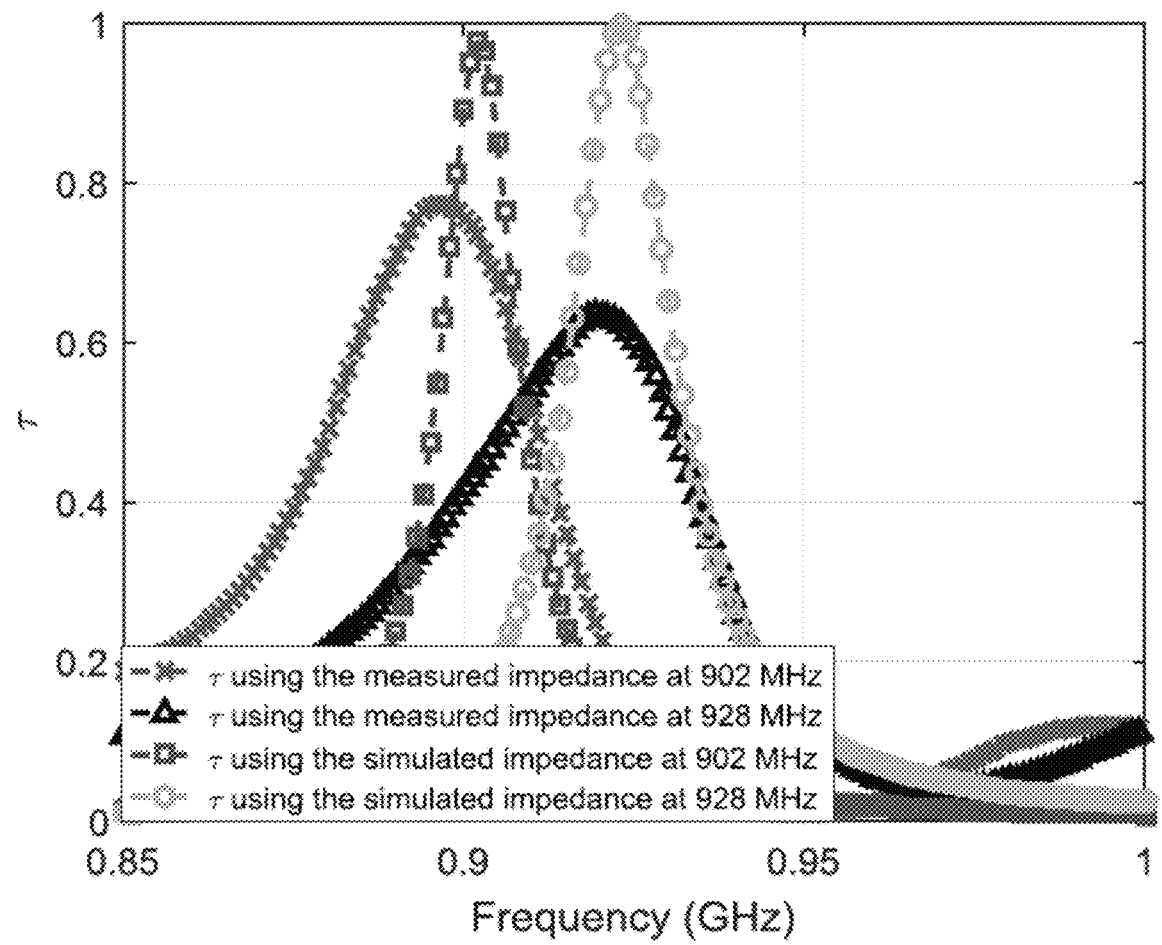
FIG. 19 is a plot of the PTC (τ) versus frequency (GHz) using simulated and measured antenna input impedances.

Also, the PTC, using (7), for both the simulated and measured impedance data are compared in FIG. 19. In other words, this plot conveys a comparison of the measured and simulated power that is delivered to the RFID IC. Both measurements and simulations show that maximum power is delivered to the RFID IC very close to the intended frequencies of 902 MHz and 928 MHz, which correspond to the two elevation heights of 3.6 mm and 6.8 mm, respectively. Also, in the sensor design, the 4D printed LCE actuator can be used to position the designed antenna at these lower and elevated heights corresponding to when the actuator is in the relaxed and excited (at a temperature threshold) states.

Figure 20:
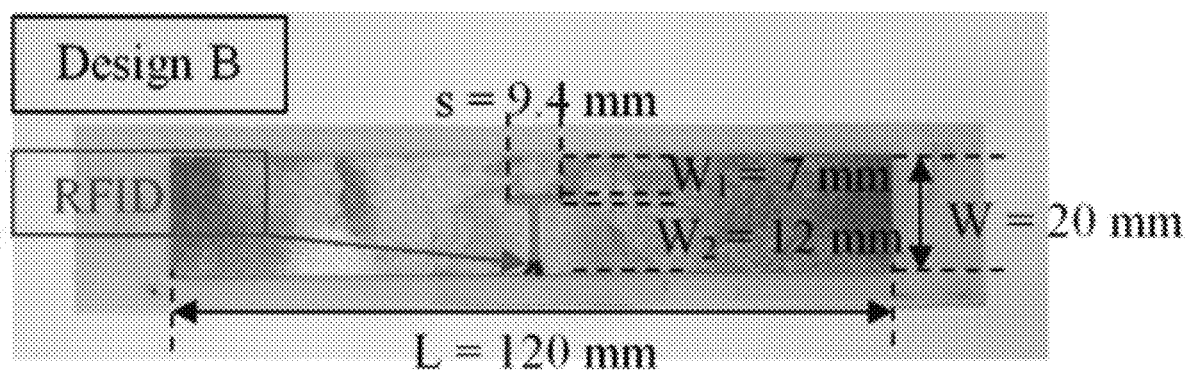
FIG. 20 is an image of a passive RFID tag design, according to an embodiment of the subject invention.

The full design of the RFID sensor was fabricated and tested using the ThingMagic Pro RFID reader. The passive sensing tag was constructed by bonding the RFID IC to the antenna of FIG. 14 using electrically conductive glue. The tag is shown in FIG. 20. The sensor has a low overall material and fabrication cost. Also, the materials required to fabricate the antenna for the sensor include readily available materials, for example, a single-sided FR4 board, a copper metal ground plane, and a plastic spacer. Moreover, the fabrication process for the high-temperature reactive 4D printed LCE array is optimized and easily repeatable. The materials required in preparing the liquid crystal ink used in the printing process of the 4D LCE array are inexpensive and easily accessible as commercial products. The total processing time is less than one day with the most time-consuming process being the oligomerization of the materials, which may take up to 12 hours. Once the liquid crystal ink is prepared, the printing of the actual LCE structure is conducted in approximately one hour using custom CAD files for the desired LCE structure. Overall, the fabrication process of the 4D printed LCE array is simple and cost-effective.

Figure 21:
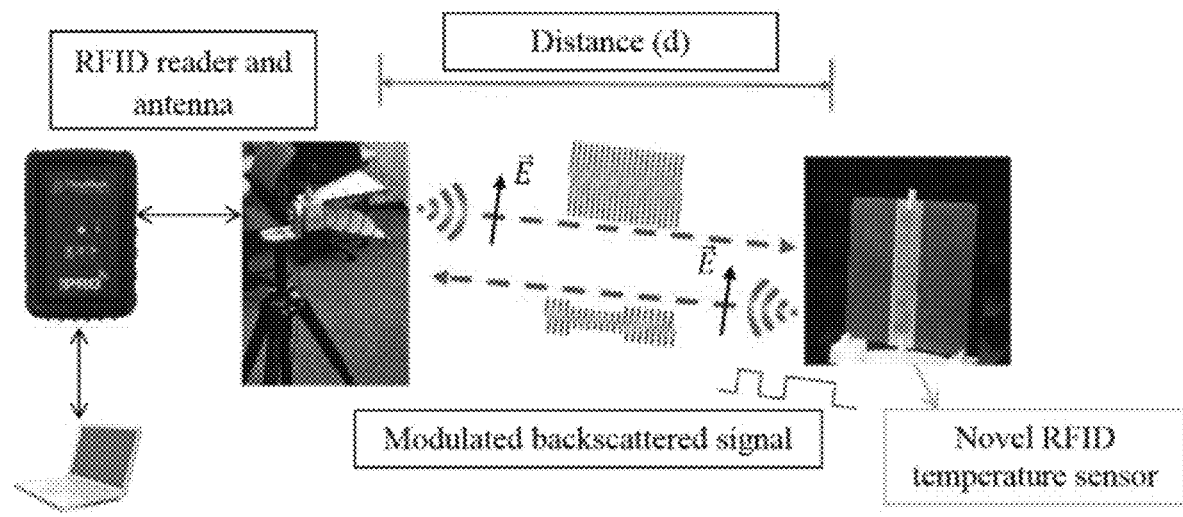
FIG. 21 shows an RFID measurement setup with vertical polarization orientation.

A schematic of the RFID measurement setup is depicted in FIG. 21. The reader emits an electromagnetic continuous wave (CW) signal towards the sensor. In return, the sensor and the surrounding environment reflect or backscatter the CW signal. The returned response of the sensor is modulated to differentiate the response of the sensor from the background environment. In the setup, the developed sensor utilizes a linearly polarized dipole antenna and the reader is connected to a linearly polarized double-ridged horn antenna with a gain of 7 dBi. During all measurements, the developed sensor and horn antenna were oriented with vertical polarization (perpendicular to the ground) as depicted in FIG. 21.

The orientation between the reader and a single developed sensor is an issue dealing with the ability to read the sensor. When both the reader and tag are vertically polarized with respect to the ground plane and have a common E-plane, the readability of the sensor is optimal. In the worst case, when the planes become orthogonal, the link between the reader and the sensor is maximally deteriorated. This polarization alignment issue is independent of the operational physics of the sensor. Hence, a change in the orientation between the reader and single sensor can only affect the ability to read the sensor with negligible impact on the temperature detection accuracy of the developed sensor. Additionally, in situations where the tag orientation is ambiguous (e.g., a shipping loading dock), circularly polarized reader antennas are deployed. This way, a linearly polarized tag can be readily read with any orientation considering a 3 dB power loss to the tag due to the circularly-to-linear polarization mismatch. Further, the issue on the temperature detection accuracy of the developed sensor when dual sensors are in close proximity with various orientations between them is addressed below.

Because the sensor design discussed herein shifts operating frequencies to convey changes in temperature, it is critical to measure the operating frequency of the sensor. To obtain this measurement, the power of the RFID reader is increased in increments of 0.1 dBm until the threshold power of the RFID IC is reached. The threshold power is identified as the minimum power level at which data begins to be retrieved from the temperature sensor. This transmitted power at which the developed sensor responds is the measurement recorded and is conducted for every frequency in increments of 1 MHz in the 902 MHz to 928 MHz band. The frequency at which the least transmitted power is required to receive data from the tag is therefore its operating frequency. Then, this procedure is repeated to verify that the data collected is consistent and therefore, reliable.

Further, there are two RFID measurement setups that were used to demonstrate the functionality of the novel RFID temperature sensor. Initially, a static setup was used to prove the operation of sensor. Then, a dynamic setup was used to demonstrate the operation of the sensor in a temperature varying environment.

Figure 22:
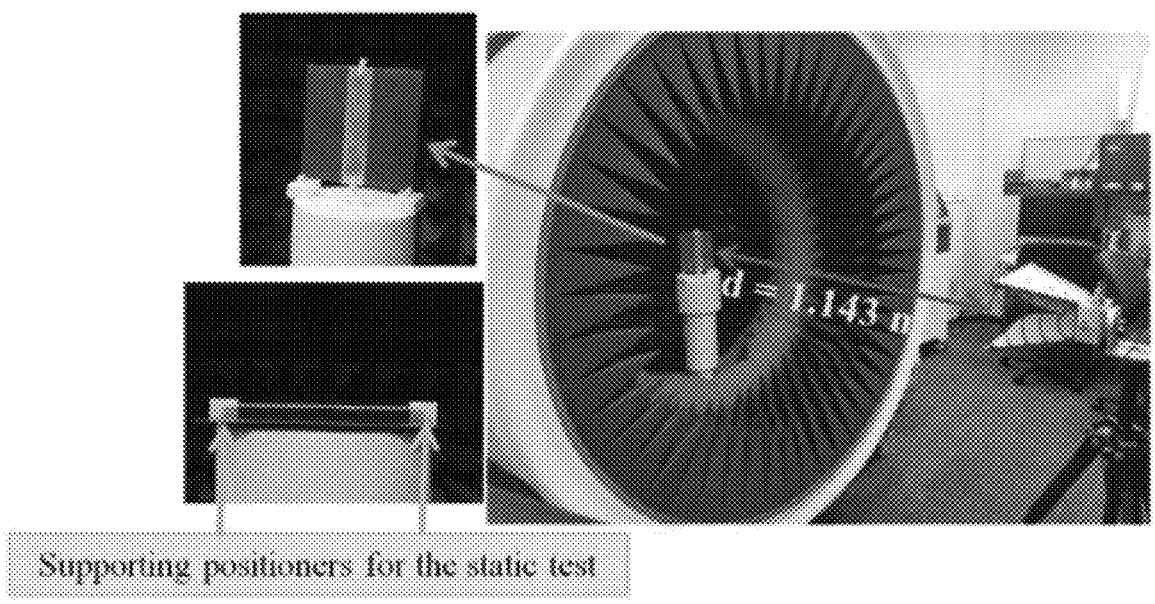
FIG. 22 shows a static test setup for an RFID tag.

The static setup demonstrates the frequency shifting capability of the sensor as the height of the planar antenna changes above the ground plane. 3D printed supporting positioners were fabricated to place the designed antenna (i.e., Design B) at the calculated heights above the ground plane, as shown in Table II. This test setup is depicted in FIG. 22, where the distance between the sensor and the reader antenna is 1.143 m.

It should be noted that the 3D printed supporting positioners were not included in the simulation. Per the simulation results, the heights of 3.6 mm and 6.8 mm provide operating frequencies, for the sensor, of 902 MHz and 928 MHz, respectively. The measurements showed that for the height of 3.6 mm, the measured operating frequency was slightly higher. This is attributed to the presence of the positioners. As a result, the height of 3.6 mm, which had been obtained through simulation, had to be slightly adjusted to 3.1 mm during the measurements for the tag to operate at 902 MHz with the supporting positioners present. The adjustment was made by incrementally trimming the positioners and the final height of the positioner was found using electronic precision calipers. The height of 6.8 mm in the measurements provided the desired operating frequency of 928 MHz and no adjustment was needed. According to the relation of the capacitance to the gap separation is asymptotic. Specifically, as the gap increases, the effect on the capacitance reduces. Thus, it is justifiable that for the lower height a slight adjustment is needed (3.6 mm to 3.1 mm), because the effect of the supporting positioners to the capacitance is more significant for the lower height than the larger height (6.8 mm).

Figure 23:
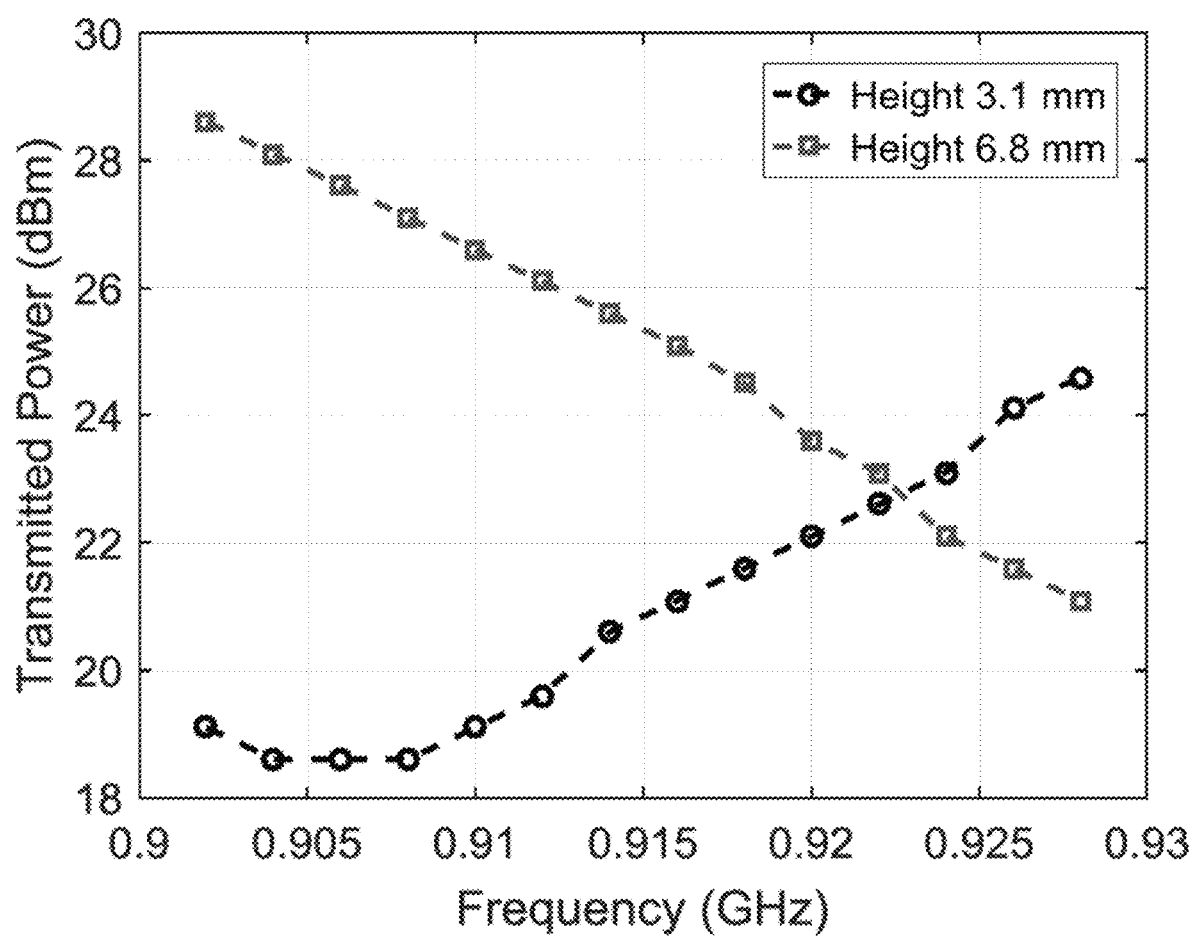
FIG. 23 is a plot of transmitted power (in decibels (dB)) versus frequency (in GHz), showing static measurements of an RFID tag at two different heights.

The static measurements for the two heights of 3.1 mm and 6.8 mm are depicted in FIG. 23. For the height of 3.1 mm, the transmitted power is the minimum at 902 MHz, which corresponds to the tag's operating frequency. As the height is increased to 6.8 mm, the operating frequency transitions to 928 MHz, where the transmitted power is lowest. As detailed above, the trend observed in FIG. 23 obeys equation (1) and the fact that the parasitic capacitance between the antenna and the ground plane is inversely proportional to the height, H (see FIG. 1), which is known from parallel-plate capacitor theory. Specifically, as the height decreases the parasitic capacitance increases and according to (1) the resonant frequency decreases. Moreover, as the height increases the parasitic capacitance decreases and according to (1) the resonant frequency increases. Therefore, the results obtained in FIG. 23 follow the theory correctly and prove that the tag operates as intended, i.e., when the antenna is set to the heights of 3.1 mm and 6.8 mm above the ground plane, the sensor operates at 902 MHz and 928 MHz, respectively. This logic also supports the results obtained during the dynamic test.

Figure 24:
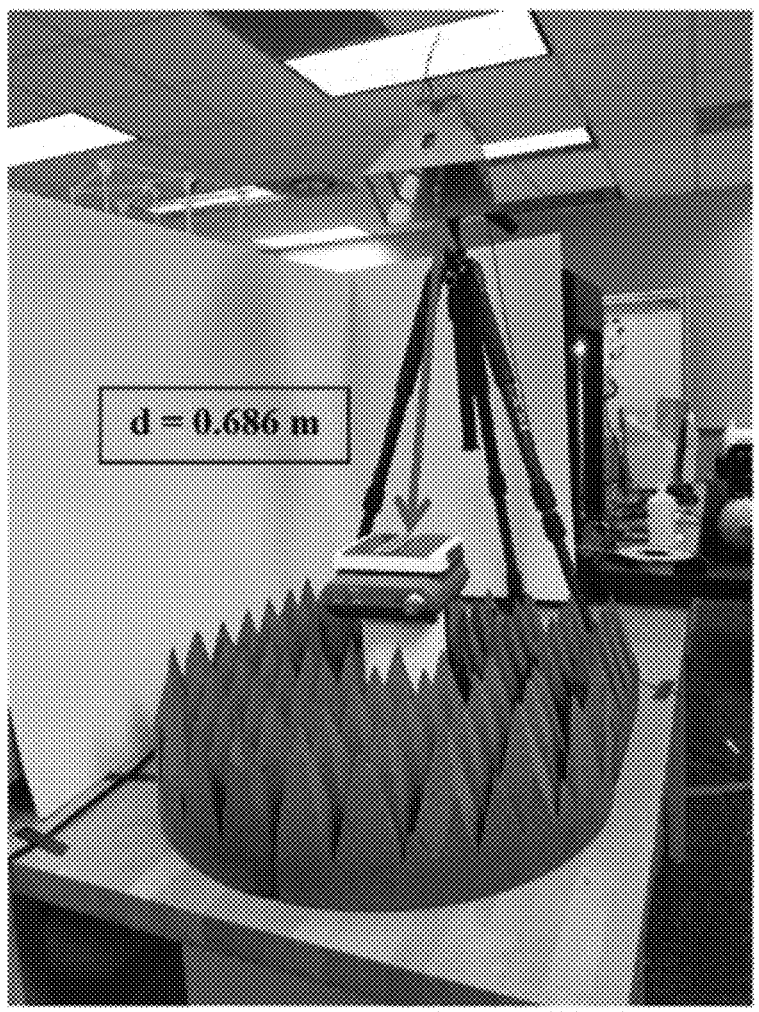
FIG. 24 is an image of a dynamic test setup for a passive RFID temperature sensor.

Dynamic testing of the RFID sensor was performed to verify its operation under different temperatures. The 4D printed LCE Archimedean chord array was placed between the antenna and the ground plane (see FIGS. 1, 2A, and 2B). Further, the sensor was then placed on a hot plate that served as the heat source. This test setup is shown in FIG. 24, where the distance between the sensor and the reader antenna was 0.686 meters (m).

Figures 25A, 25B:
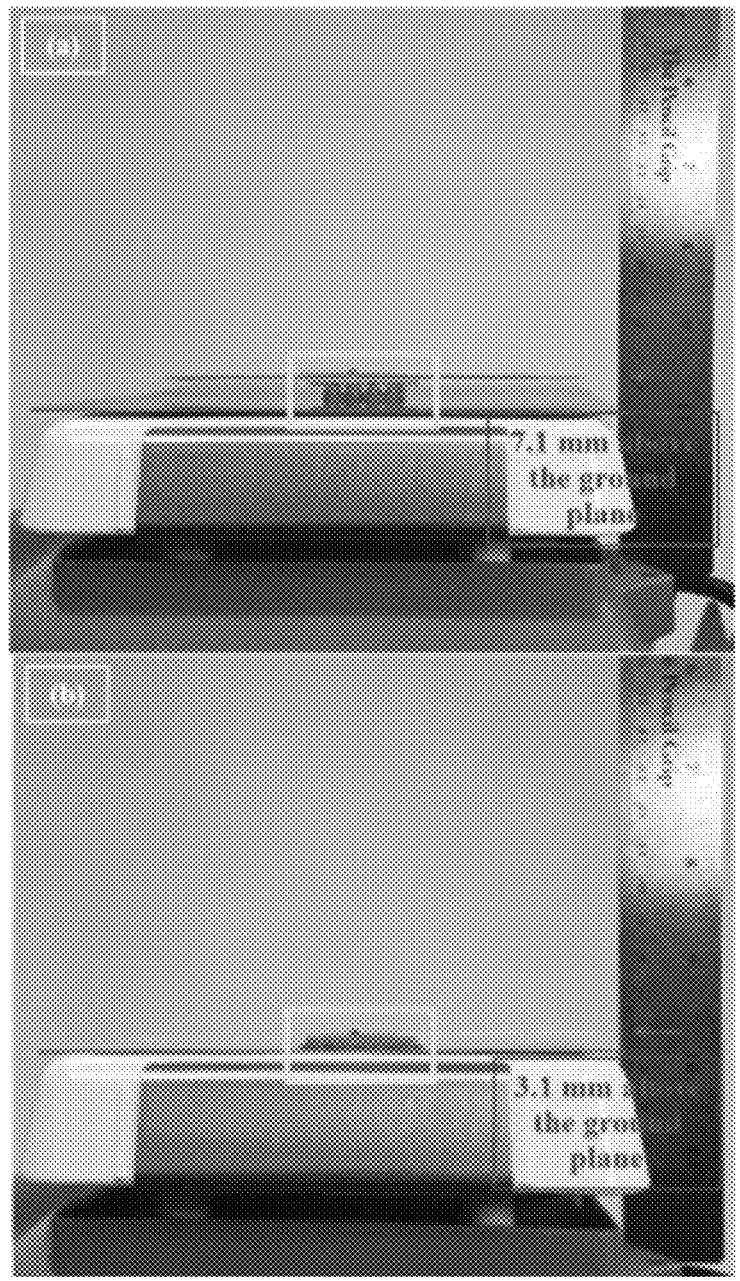
FIGS. 25A and 25B are images of a dynamic RFID test setup with a heat source that is used to stimulate the LCE array.

Using electronic precision calipers, the LCE array in its relaxed flat state was measured to have a thickness of 1.045 mm. Accordingly, a 3D printed spacer with a thickness of 2.055 mm was placed between the antenna and the LCE array to support the antenna at the required height of 3.1 mm above the ground plane. As the temperature increases, the flat 4D printed LCE array expands into a conical shape in the direction normal to the ground plane thereby increasing the height of the antenna above the ground plane. The maximum actuation displacement of the LCE array was measured to be 4 mm using a measuring ruler (see FIGS. 25A and 25B). Specifically, when the temperature of the LCE array reaches 160° C., the LCE array raises the antenna by 4 mm to reach a height of 7.1 mm above the ground plane (which is very close to 6.8 mm as determined by simulation).

Figure 26:
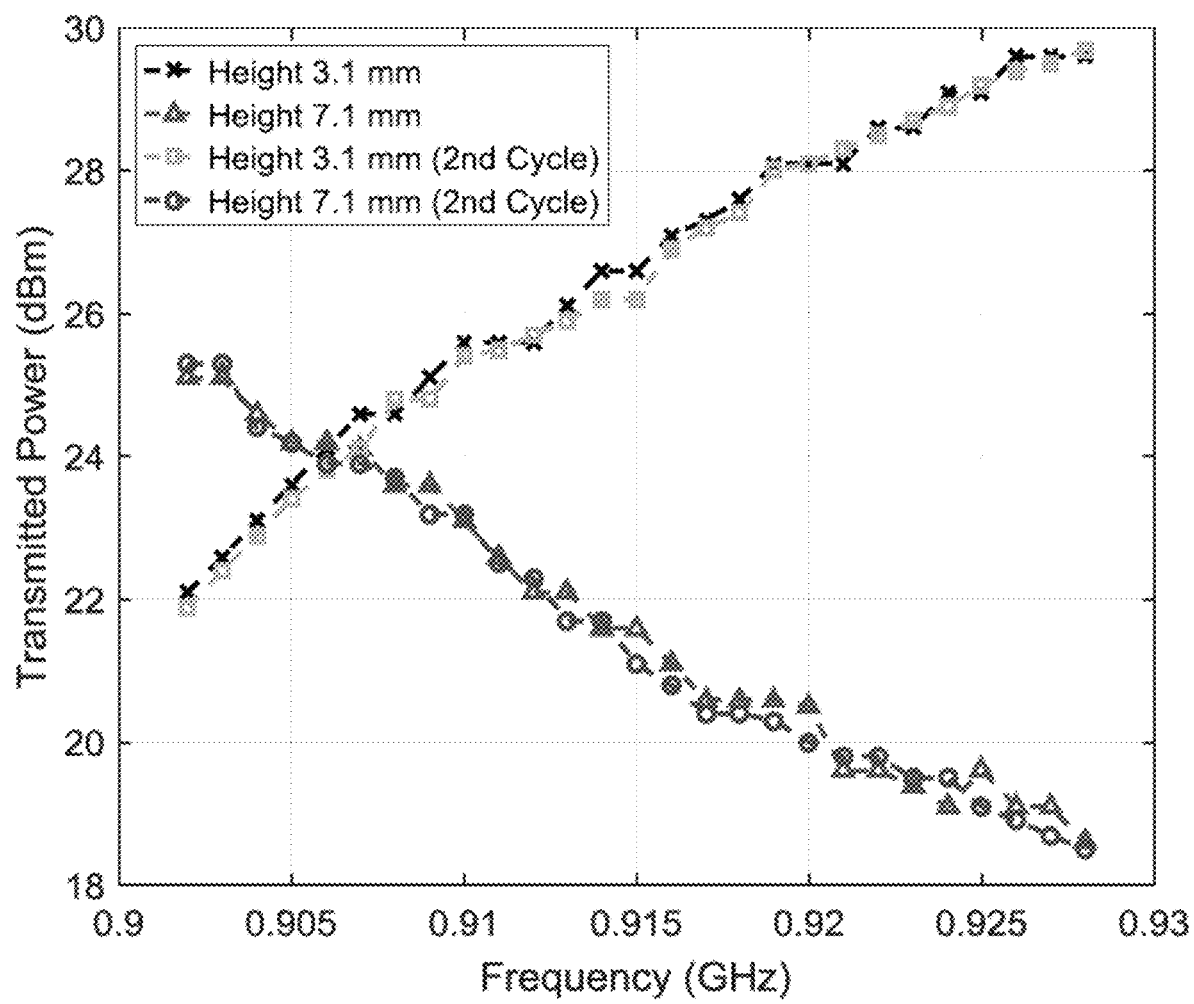
FIG. 26 is a plot of transmitted power (in dB) versus frequency (in GHz), showing dynamic measurements of an RFID tag at two different heights.

The data confirms that the RFID passive sensor operates as expected. Specifically, at room temperature, the LCE is in its flat and relaxed state holding the antenna 3.1 mm above the ground plane. At this height, the measured transmitted power is the minimum at 902 MHz, which corresponds to the intended operating frequency, and this is conveyed by the black trace in FIG. 26. Moreover, as the heat source is activated, the LCE actuates the antenna to 7.1 mm above the ground plane (see FIGS. 25A and 25B). Consequently, the measured transmitted power is at the minimum at 928 MHz, which corresponds to the intended operating frequency, as depicted by the red trace in FIG. 26. Further, to justify the repeatable nature of the sensor, when the LCE array returned to room temperature a second test was conducted as shown by the cyan trace (FIG. 26) where the operating frequency has returned to 902 MHz. Subsequently, the heat stimulus was applied once again to the LCE array and the operating frequency shifted as intended to 928 MHz, which is depicted by the blue trace in FIG. 26. The performance of the second test matches that of the initial test. Hence, this proves the capability of the developed sensor to measure temperature threshold violations multiple times. In this design, after running multiple hot and cold temperature cycles, it was observed that the 4D printed 4×2 LCE Archimedean chord array takes on average 25 seconds to return to its relaxed-flat state after the heat stimulus has been removed.

In addition, due to the actuation of the designed antenna above the ground plane, the transition of the operating frequencies between 902 MHz and 928 MHz for the sensor is continuous. Therefore, a linear approximate expression relating the detected temperature to the frequency of operation of the developed RFID temperature sensor can be formulated as follows:

$$\text{Temperature} = 5.296 \times (\text{Frequency}) - 4730 \quad (22)$$

This formulation is appropriate within the frequency boundary of 902-928 MHz and the temperature is in degrees Celsius.

Moreover, the measurements validate the simulation results and design methodology. This temperature sensor is unique because: (a) it is passive, i.e., no battery is needed, thereby having very long lifetime and very low cost; (b) it can be reused multiple times (vs. other current sensors that can only detect one temperature threshold) to monitor when the temperature reaches a high temperature threshold as well as when the temperature drops below the temperature threshold; and (c) it provides continuous monitoring of goods that assists in the intelligent assessment of their quality.

Figure 27:
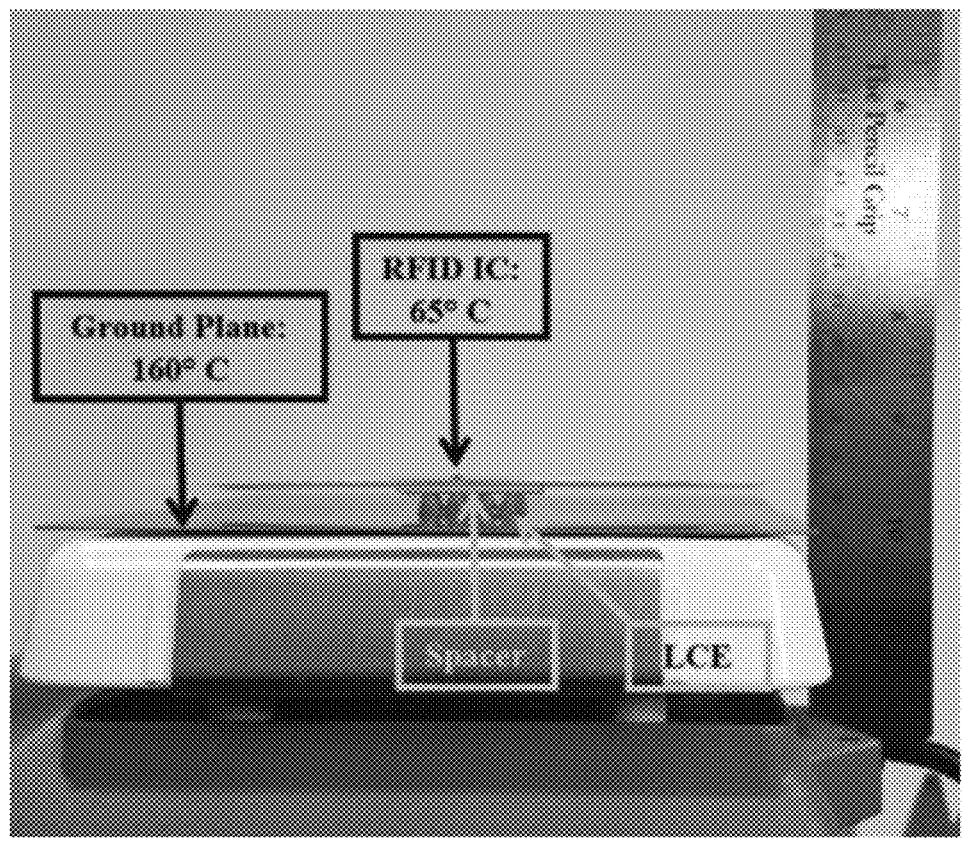
FIG. 27 is an image of an LCE array and spacer providing partial isolation of the antenna from the heated ground plane.

The RFID IC used in this research was the Alien Higgs III. The temperature of 160° C. where the developed sensor operates far exceeds the operating temperature range where the input impedance of the RFID IC remains constant, which is from −50° C. to 85° C. However, this elevated temperature has a negligible impact on the RFID IC input impedance because the RFID IC is partially isolated from the heated ground plane. That is, the designed antenna with the ITMN is supported above the ground plane by the LCE array and spacer (see FIG. 27). As a result, the antenna that supports the RFID IC never reaches the temperature of the ground plane (160° C.).

During experimentation, using an inferred thermometer, the temperature at the RFID IC was observed to reach approximately 65° C. This measured temperature is well within the manufacturer's range of operating temperatures, where the input impedance of the RFID IC remains constant; hence, the input impedance of the RFID IC is unaffected. In contrast, if the entire sensor is exposed to a temperature of 160° C., the sensor may not be expected to function adequately (if the Alien Higgs III RFID IC is used as an RFID IC) because the temperature has greatly exceeded the RFID IC manufacturer's specifications. However, a different RFID IC can be used that can withstand such temperatures.

Simulation modeling was used to test whether 4D printed LCEs are a viable choice for the dynamic control of antenna structures to detect temperature threshold crossings. The sensor was tested in a stand-alone-mode to prove its functionality. Simulation modeling was used to test the performance of the sensor in practical settings. First the performance of the sensor was tested when placed on shipping boxes made of various materials carrying a payload that represents fruits and vegetables. Subsequently, the temperature detection accuracy of the sensor was tested by placing an identical sensor in close proximity at different orientations. In this case, both sensors are placed on individual shipping boxes that are modelled as cardboard with payloads that represent fruits and vegetables. The software ANSYS HFSS was used for the simulation modeling.

Figure 28:
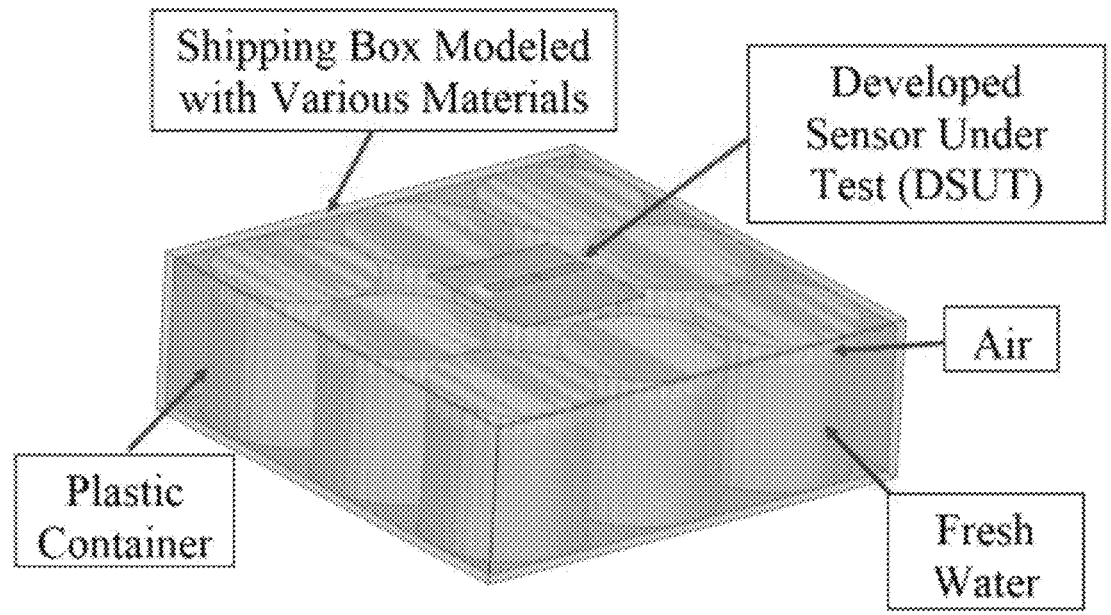
FIG. 28 is a simulation model of a shipping box modeled with various material properties and with a payload of fresh water representing fruits and vegetables.

Fruits and vegetables are a common perishable payload in the cold-supply-chain and are made up mostly of water. Thus, a batch of nine plastic bottles filled with fresh water fitted into a shipping box was modeled. Moreover, the typical materials used for containing such perishable items during delivery in the cold-supply chain vary and include cardboard, wood, and plastic. For that reason, in the simulation test, the payload (plastic bottles with fresh water) was kept constant and the material properties of the shipping box were varied. A 508×508×165 mm box with 3 mm thickness was constructed and the relative permittivity and loss tangent were appropriately set to represent the material properties of cardboard, wood, and plastic. Subsequently, the box was modeled as a perfect electric conductor (PEC) to study the effect of mounting the proposed sensor on large metallic structures. In each case, the sensor was placed on the box and actuated at the predetermined heights where the sensor operates at 902 MHz and 928 MHz when no box and/or payload is present. The simulation model is shown in FIG. 28. The results of varying the material properties of the shipping box are depicted in FIG. 29.

Figure 29:
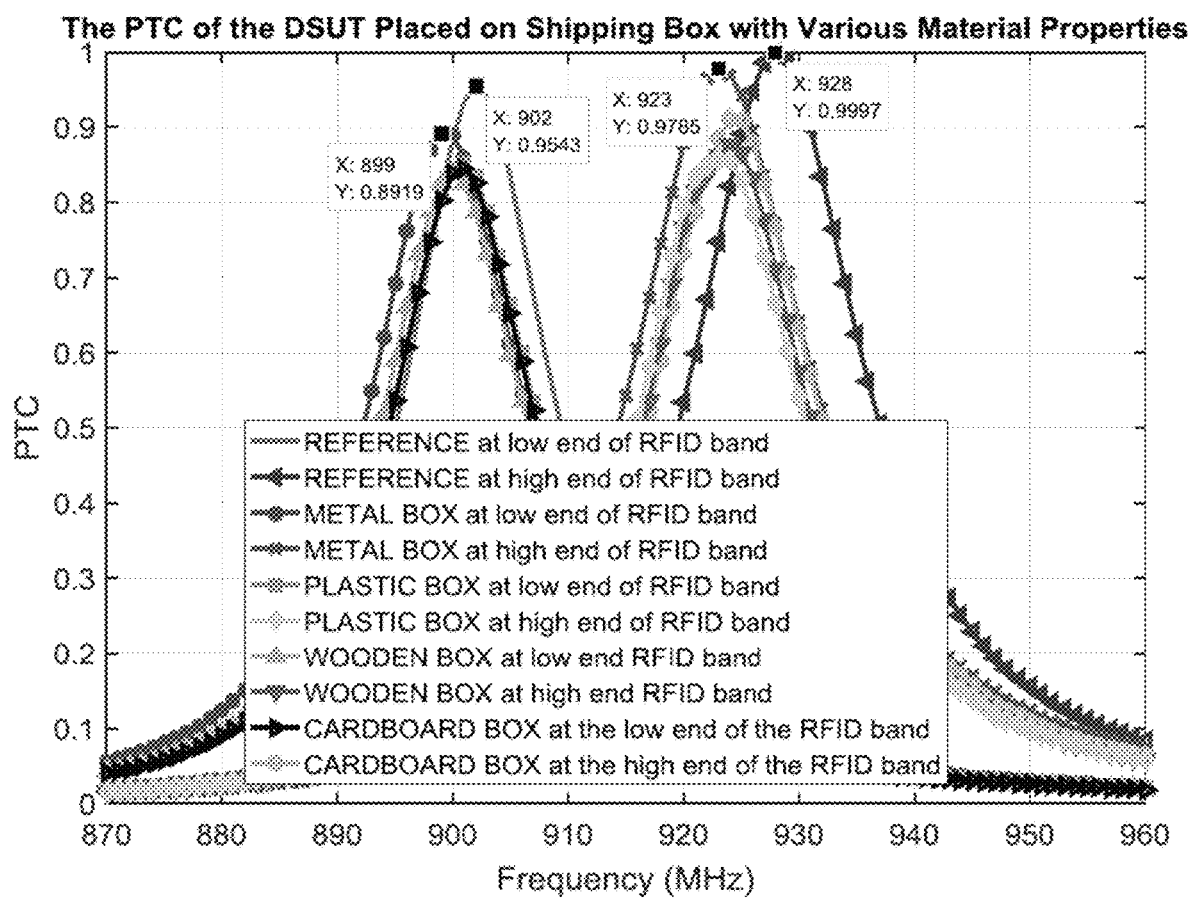
FIG. 29 is a plot of PTC versus frequency (in MHz), showing PTC simulation results of a sensor of an embodiment of the subject invention when placed on a shipping box made of different material properties.

Referring to FIG. 29, the results depict the PTC when the Developed Sensor Under Test (DSUT) is at room-temperature operating at 902 MHz and also when the DSUT has reached the temperature threshold and operating at 928 MHz. The magenta and brown traces are provided as a performance reference and represent the frequency response of the DSUT when no shipping box is present at 902 MHz and 928 MHz, respectively. The remaining traces represent the frequency response of the DSUT at room temperature (where the DSUT operates at the lower end of the RFID band) and at elevated temperatures (where the DSUT operates at the higher end of the RFID band) when mounted on top of the shipping box for different material properties of the box (cardboard, wood, plastic, and metal). The DSUT refers to the sensor of an embodiment of the subject invention that was fabricated and is discussed in detail herein (see FIG. 20).

In general, the presence of the shipping box increases the parasitic capacitance. Based on the results shown in FIG. 29, when the shipping box is present, the two operating frequencies (i.e., one at the lower end and one at the higher end of RFID band) of the antenna decrease compared to ones where no box is present, i.e., reference curves. Also, when the shipping box is present, the PTC decreases due to the losses associated with the various materials used to simulate the shipping box and the goods. Although there is a shift in the operating frequency along with a decrease in the PTC, the performance of the DSUT remains promising. Specifically, considering the lower limit of the RFID UHF band (near 902 MHz), the shifts of the lower frequency response for all the different shipping boxes are minor (the greatest shift is for the metal shipping box that reduces the operating frequency of our sensor to 899 MHz). Moreover, at 902

MHz (the start of the RFID UHF band), the PTC is approximately 80% for all the different shipping boxes compared to 95% for the case with no shipping box. Considering the upper limit of the RFID UHF (near 928 MHz), the largest frequency shift occurs again for the metal shipping box when the maximum PTC is 97% at 923 MHz. Additionally, the upper frequency responses for all the other shipping boxes have a maximum PTC larger than 85% at approximately 925 MHz. In summary, the simulation results indicate that the sensor can still successfully detect temperature threshold crossings with good separation in the RFID UHF band even in the presence of perishable goods packaged in shipping boxes of various materials.

Figure 30:
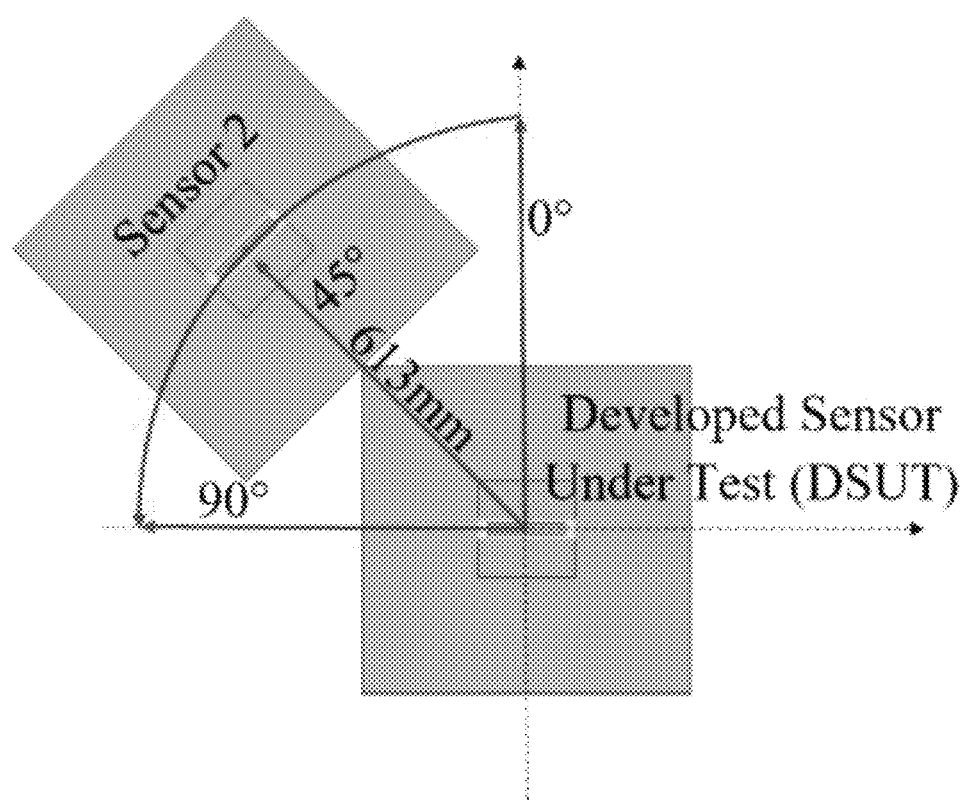
FIG. 30 is an ANSYS HFSS simulation model with multiple sensors to test the susceptibility in the temperature detection accuracy of a sensor, of an embodiment of the subject invention, under test.

A simulation model was developed to study the temperature detection accuracy of the DSUT in the presence of additional sensors on practical items with varying orientations. The developed model of the cardboard shipping box is used with the payload that represents fruits and vegetables. The DSUT is placed on top of such a box, as shown in FIG. 28, and detailed in the previous section. Subsequently, a pair of these models is placed adjacent to each other. The first sensor (DSUT) along with the corresponding shipping box is placed at the origin and the second sensor along with its corresponding box is rotated at 0°, 45°, or 90° around the DSUT. The setup of this simulation test is shown below in FIG. 30.

For each position of the second sensor and corresponding shipping box (i.e., 0°, 45°, and 90° in FIG. 30), the DSUT is tested in the relaxed and excited states with the second sensor in the relaxed state. Second, the same test is repeated; however, the second sensor is in the excited state. The relaxed state refers to when the positioning of the designed antenna of the sensor is closer to the ground plane (and the LCE array is relaxed at room temperature) operating at the lower end of the RFID UHF band (near 902 MHz). The excited state is when the sensor is exposed to elevated temperatures and the designed antenna is actuated (by the temperature reactive LCE array) above the ground plane and the sensor operates at the higher end of the RFID UHF band (near 928 MHz). The results of the simulations are depicted in FIG. 31.

Figure 31:
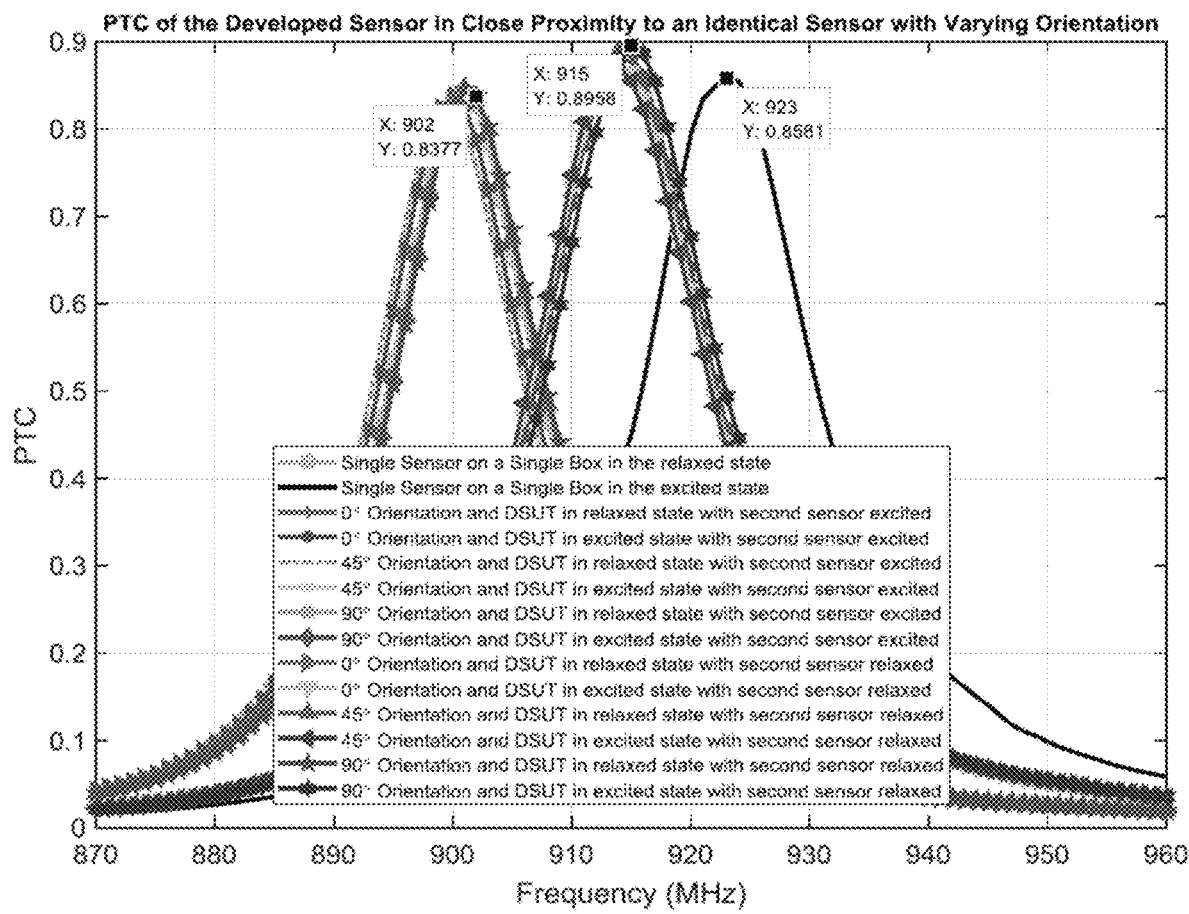
FIG. 31 is a plot of PTC versus frequency (in MHz), showing ANSYS HFSS simulation results when the developed sensor under test (DSUT; that is, a sensor of an embodiment of the subject invention, being tested) has been exposed to elevated temperature and is in close proximity with an identical sensor whose orientation is varied.

In FIG. 31, the cyan and black traces are provided for reference and convey the performance of the DSUT in the relaxed and excited states on a single shipping box, respectively. Moreover, when the DSUT is operating in the relaxed state, the performance is unaffected by the presence of the second sensor with its shipping box in this setup. Moreover, this performance is irrespective of the orientation and state of the second sensor. This is captured in FIG. 31 as all the curves corresponding to the operation of the DSUT in the relaxed state are almost identical to the reference curve (cyan trace). Also, the DSUT always operates sufficiently with a PTC of above 80% at 902 MHz (which is the starting frequency of the RFID UHF band).

Moreover, referring again to FIG. 31, when the DSUT is excited in the presence of the second sensor, its operating frequency shifts to 915 MHz (923 MHz was the operating frequency of the single excited DSUT on a shipping box as shown by the black trace in FIG. 31). Also, regardless of the state or orientation of the second sensor (and its corresponding shipping box), the DSUT always operates at 915 MHz in the presence of the second sensor in this setup. This is observed in FIG. 31 because all the curves corresponding to the operation of the DSUT in the excited state have a maximum at 915 MHz with a favorable PTC of above 85%. The shift from 923 MHz to 915 MHz in the operating frequency of the DSUT, when it is in the excited state, may be attributed to the inverted-parabolic relation of the plate separation to the effect of the fringing field at relatively small separations in parallel plate capacitors. Specifically, through experimentation, it is found that, as the plate distance increases, there exists a sudden plate distance where the effect of the fringing field is maximum as opposed to a continuous diminishing fringing field with increasing plate separation as predicted by theoretical formulas. Thus, at that critical distance, the parallel plate capacitor is more susceptible to the surroundings. Consequently, this increases the effective permittivity and in turn the overall capacitance. Similarly, for the RFID sensor antenna there is a distance, where the fringing fields of DSUT are most susceptible to the surroundings and the presence of the additional shipping increases the overall effective permittivity. This causes the total parasitic capacitance to increase thereby decreasing the operational frequency according to (1).

This simulation test clearly depicts the ability of the sensor to detect temperature thresholds even in the presence of an additional sensor on another shipping box. In other words, the temperature detection accuracy of the sensor is not hindered by the presence of the second sensor because at room temperature the sensor will be read at 902 MHz (as this is the starting frequency of the UHF RFID band) and when the temperature reaches a certain threshold it will read at 915 MHz. These two frequencies are 13 MHz apart, which provides sufficient separation to detect that a temperature threshold has been reached.

As discussed above, a passive (i.e., battery-free) RFID temperature sensor according to an embodiment was developed, analyzed, and validated. The sensor included a planar dipole antenna that is actuated above a ground plane. Consequently, the actuation causes the frequency shift. A unique 4D-printed LCE array provides the temperature dependent actuation of the antenna above the ground plane that is reversible and repeatable. Additionally, the planar dipole antenna is customized with the ITMN to match the antenna to the RFID IC at both 902 MHz and 928 MHz operating frequencies. The antenna was fabricated and the input impedance was measured using a customized differential test fixture. The final design was then verified with two test setups using a commercially available RFID reader. Initially, the sensor was tested in a static arrangement to first prove its operation. Subsequently, the sensor was placed in a dynamic arrangement with the LCE array in an actual temperature varying environment. All measured data met favorably with the theory and simulation. Therefore, it can be concluded that this temperature sensor will operate effectively for detecting temperature threshold crossings for essential foods and pharmaceuticals during shipping in the cold supply chain. The sensor is novel and practical as it self-tunes its operating frequency as temperature changes in a continuous fashion. This is done wirelessly without any physical intervention. The cost effectiveness and longevity of the sensor is ensured because the device is fully passive. The 4D printed LCE technology used here responds to high temperatures (approximately 160° C.). The sensor can have many applications, including but not limited to monitoring perishable goods in the cold supply chain where the temperature is approximately 0° C. The physics involved in the shifting of the sensor's operating frequency is independent of the temperature. The only component that is dependent on the temperature is the 4D printed LCE array used. Therefore, shape-memory polymers or LCEs that respond to cold temperatures can be used in the sensor to provide temperature threshold detection at lower temperatures, which are appropriate for the cold supply chain. The sensor design is a passive tag that can be retrofitted with the appropriate LCEs to detect different ranges of temperature change. Also, the unique advantage of LCEs compared to other active materials is their ability to operate reversibly and they are reusable since they are able to go through many high/low temperature actuation cycles.

In another embodiment, a sensor can use a patch antenna with an appropriately designed slot. When the slot is shorted with a switch the antenna operates at a different state corresponding to a different operating frequency. The switch is designed using LCEs and it extends and retracts based on the temperature. Moreover, as the antenna switches states, the input impedance changes as well. For this reason, a customized matching network can be used to provide a good match to the RFID IC in both shorted and non-shorted slot states. The sensor design was verified using ANSYS HFSS.

The sensor with a patch and slot can be used to detect a temperature above a certain threshold. This is accomplished through a designed frequency shift within the RFID bandwidth (e.g., within the narrow RFID bandwidth of 902-928 MHz). For this reason, a patch antenna with an inherently high-Q factor can be selected.

Figure 32:
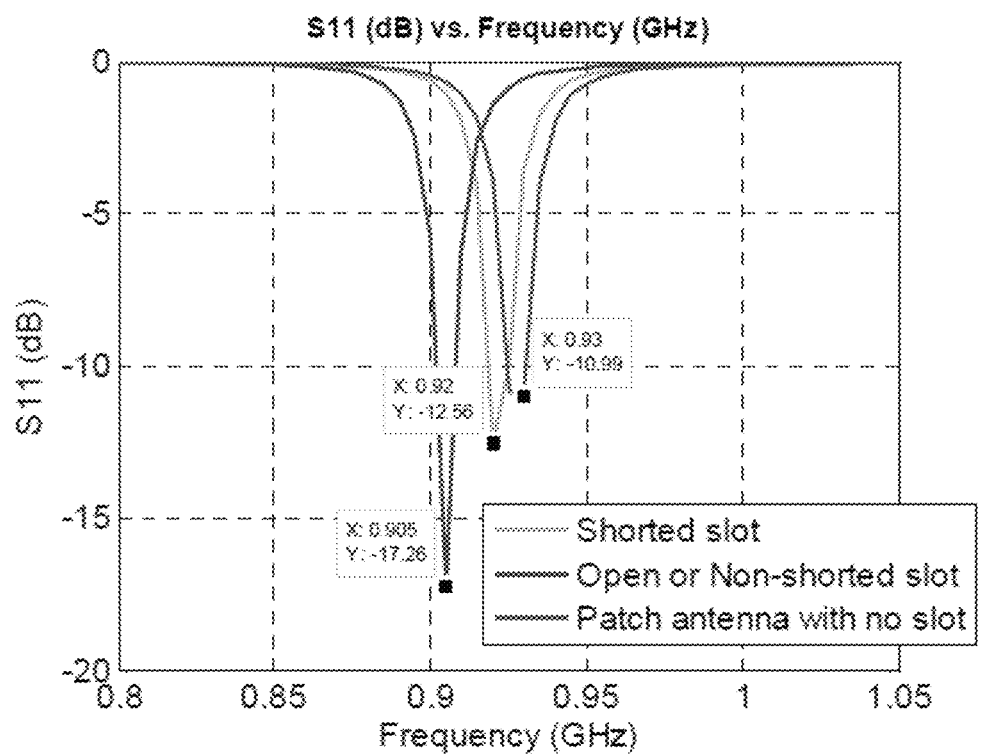
FIG. 32 is a plot of $S_{11}$ (in dB) versus frequency (in GHz) for patch antennas with a shorted slot and a non-shorted slot.
Figure 33:
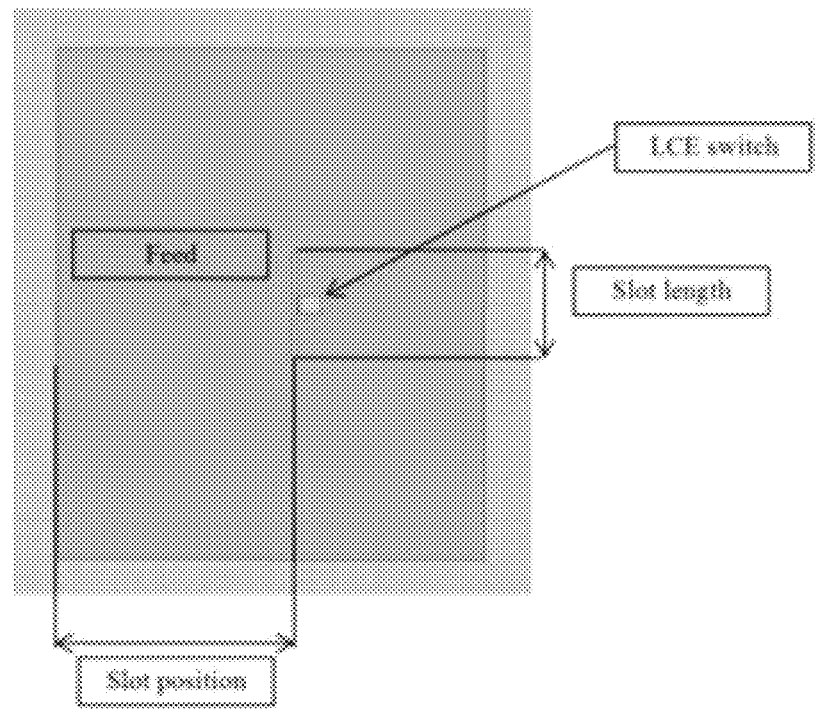
FIG. 33 is a schematic view of a patch antenna with a slot and LCE switch, according to an embodiment of the subject invention.

The addition of a slot in the patch antenna effectively increases the electrical length of the antenna. As a result, the resonant frequency of the antenna decreases. When the slot is shorted, the electrical length decreases and the resonant frequency increases. Moreover, the frequency of the antenna when the slot is shorted will always be slightly less than the original design frequency of the antenna; this relation is depicted in FIG. 32. The layout of the patch antenna with the slot is depicted in FIG. 33.

Referring to FIG. 32, the following is a generalized design procedure for the sensor patch antenna:
1. Determine the desired operating frequency of the patch antenna with the shorted slot (cyan).
2. Design a patch antenna at a slightly higher frequency than the frequency determined from step 1 (red).
3. Determine the position and length of the slot so that the antenna resonates at the lower end of the RFID band (blue).
4. The position determined in step (3) should allow the antenna to resonate at the frequency determined in step (1) (cyan) when the slot is shorted.

Figure 34:
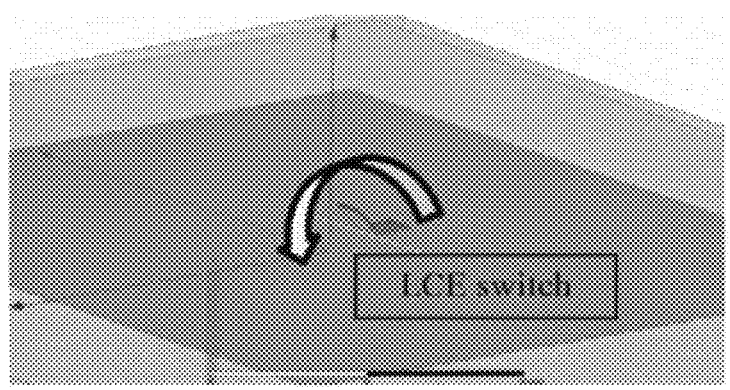
FIG. 34 is a schematic view showing actuation of an LCE switch, according to an embodiment of the subject invention.
Figure 35:
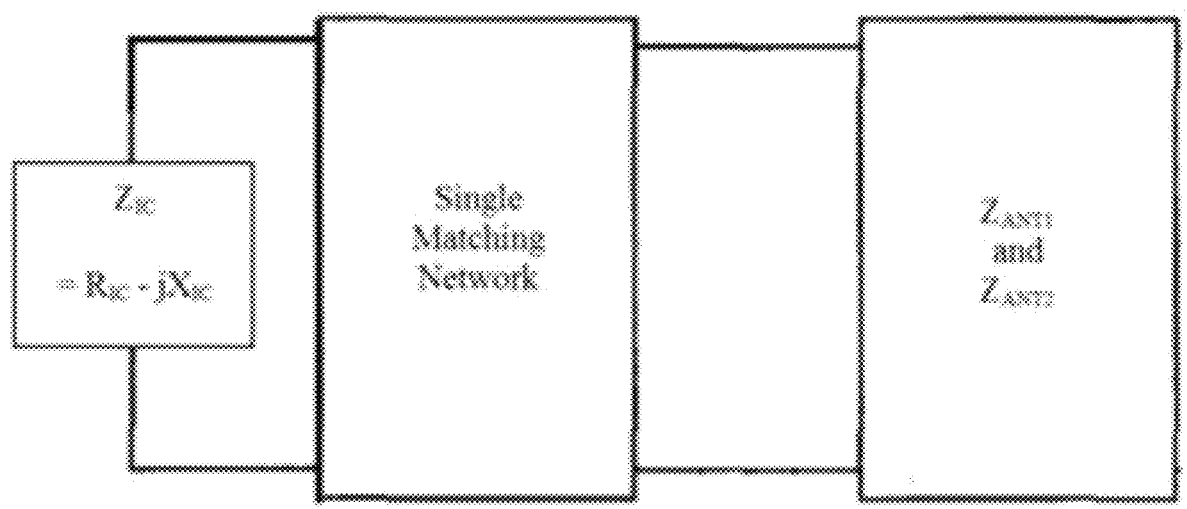
FIG. 35 is a schematic showing a single matching network to accommodate two antenna impedance states.

In order for the antenna to shift operating frequencies, a mechanism to short the slot must exist. A switch using a novel LCE can be used. When the temperature reaches a certain temperature level the LCE switch extends and shorts the slot thereby changing the operating frequency of the antenna. Also, when the temperature drops below this temperature level the switch retracts and brings the antenna to its original geometry and operating frequency, referring to FIG. 34. Therefore, this temperature sensor can be used repeatedly as the LCE actuation is reversible. The antenna can shift its operating frequency states from 905 MHz to 920 MHz when the temperature reaches a certain high temperature. At each of these states the input impedance varies from $ZA_{NT1}$ to $Z_{ANT2}$, respectively. Accordingly, an impedance matching network must be designed to provide a favorable match to the RFID IC impedance (ZIC) in both states, as shown in FIG. 35.

In an embodiment, the antenna can comprise a slot (e.g., the antenna can be a patch antenna comprising a slot), and the temperature sensor can comprise a switch positioned in the slot of the antenna. The temperature sensor can be configured such that the LCE expands or contracts as the temperature changes to cause the switch to engage or disengage to thereby change the operating frequency of the antenna. The switch can be separate from the LCE such that the LCE itself is not the switch but is used to active the separate switch. See also Shafiq et al. ("A Passive RFID Temperature Sensing Antenna With Liquid Crystal Elastomer Switching," in IEEE Access, vol. 8, pp. 24443-24456, 2020, doi: 10.1109/ACCESS.2020.2969969), which is hereby incorporated by reference herein in its entirety.

Figure 36:
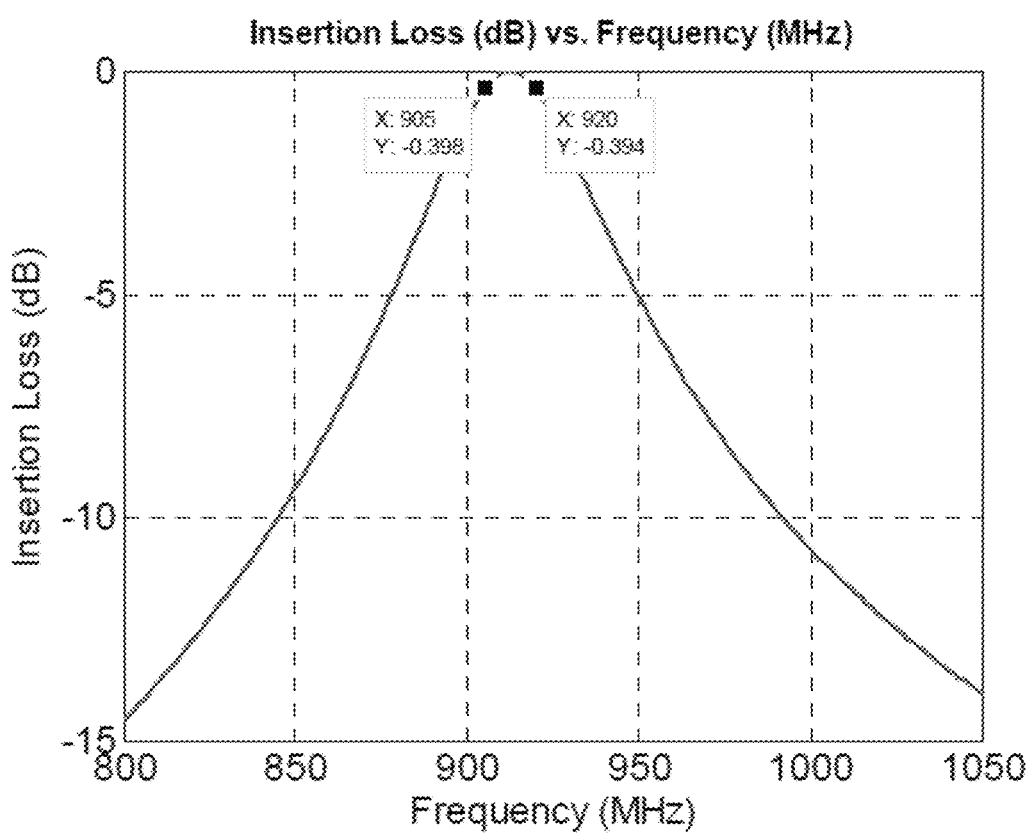
FIG. 36 is a plot showing insertion loss (in dB) versus frequency (in MHz) for a matching network of an embodiment of the subject invention.

For ease of fabrication, a matching network using a microstrip transmission line can be used. A short-circuited stub technique can be used to achieve the needed matching. The design provided a favorable match with minimal losses at both antenna operating frequencies of 905 MHz and 920 MHz. The performance of the match is measured by the insertion loss (IL) and is depicted in FIG. 36. The temperature passive RFID sensor using LCEs includes a patch antenna with a slot. The sensor can detect when the temperature is higher or lower than a set temperature level by shifting its operation between two frequencies in the RFID band. This frequency shift is achieved with a novel metalized LCE switch that extends to short the slot when the temperature is higher than a certain level. When the temperature falls below this level, the LCE switch retracts, thereby removing the short and returning the antenna to its initial operation state. Therefore, this temperature sensor can be used repeatedly as the LCE actuation is reversible. Additionally, a matching network can be included to accommodate both the antenna states and provide a favorable match to the RFID IC.

In an embodiment, a sensor can use a planar dipole antenna design with a customized matching technique for a complex conjugate match to the RFID IC. Specifically, a TMN can be integrated into the planar dipole antenna. Further, an innovative 3D printed LCE can be used to actuate the antenna. As a result, the sensor detects increases in temperature through detectable shifts in its operating frequency. The design was verified using ANSYS HFSS simulations and measurements. The TMN serves as a means of impedance matching, and it is a general form of the folded dipole antenna because the length and/or the diameters of the two legs are not generally the same, as seen in FIG. 5.

As a result, the current distribution in each leg depends on the radii a' and a. In order to account for this non-uniform current distribution, the current division factor ($\alpha$) based on the geometry is introduced.

$$\alpha = \left(\ln\left(\frac{x}{a'}\right)\right) / \left(\ln\left(\frac{x}{a'}\right) - \ln\left(\frac{a}{a'}\right)\right) \tag{23}$$

A transformer model can suitably represent the TMN. On the load side, there exists an input antenna impedance ($Z_{AN}T$) of a dipole antenna without any matching network. While on the source side there exists a shunted transmission line impedance, $I_{TL}$. Accordingly, the input ($Z_{IN}$) impedance becomes:

$$Z_{IN} = R_{IN} + jX_{IN} = \frac{2Z_{TL}[(1+\alpha)^2 Z_{ANT}]}{2Z_{TL} + (1+\alpha)^2 Z_{ANT}} \tag{24}$$

To achieve maximum power gain, $Z_{IN}$ should be matched to the complex conjugate of the impedance of the RFID IC; that is:

$$Z_{IN} = Z_{IC}^* = R_{IC} - jX_{IC} \tag{25}$$

The antenna along with the integrated TMN can be rendered into a microstrip planar design, as shown in FIG. 8 (note that the EERs listed in FIG. 8 are for exemplary purposes and should not be construed as limiting). The integrated TMN design is advantageous because only four design parameters (L, W, $W_1$, and s) exist. It is a favorable matching technique as it provides a systematic means for synthesizing a matched antenna for RFID applications. This is in direct contrast to complex meandered RFID antenna designs that have a large number of design parameters.

Figure 37:
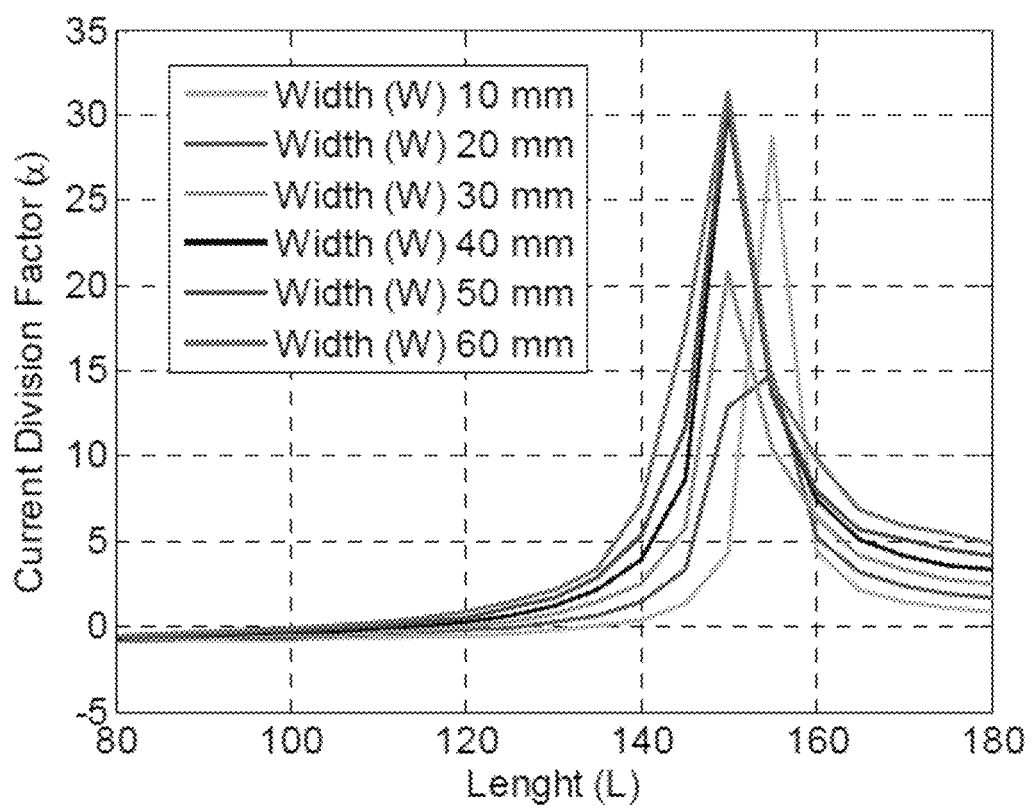
FIG. 37 is a plot of current division factor (α) versus dipole length (L) for different dipole widths (W).

An expression for the current division factor ($\alpha$) as a function of $Z_{ANT}$ can be derived by equating (24) and (25). Using ANSYS HFSS, a dipole was designed near the upper RFID band of 920 MHz with various widths, W. The length, L, was then swept within a defined range. The curves obtained are shown in FIG. 37, and they represent all possible solution combinations of the width, W, and length, L, of the antenna with the ITMN. The judicious selection of the width (W) and length (L) will depend on the best match obtained at both the upper (920 MHz) and lower (904 MHz) operating frequencies of the RFID band. Further, once the length (L) and width (W) are decided, the width ($W_1$) is obtained by (23).

Figure 38A:
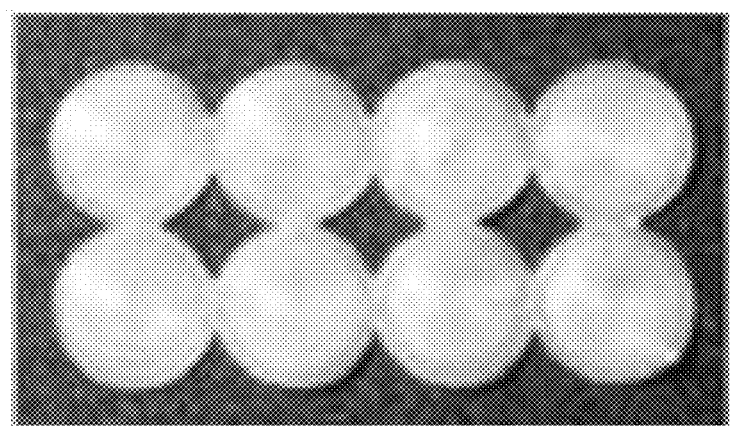
FIG. 38A shows an image of a 3D printed 2×4 LCE array.
Figure 38B:
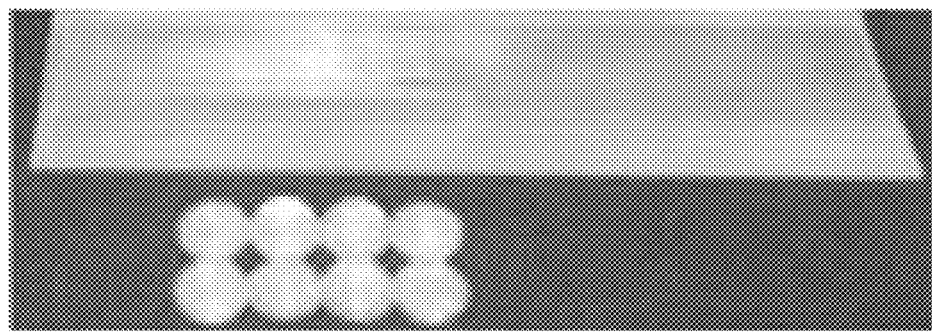
FIG. 38B shows an image of an antenna with an ITMN.
Figure 38C:
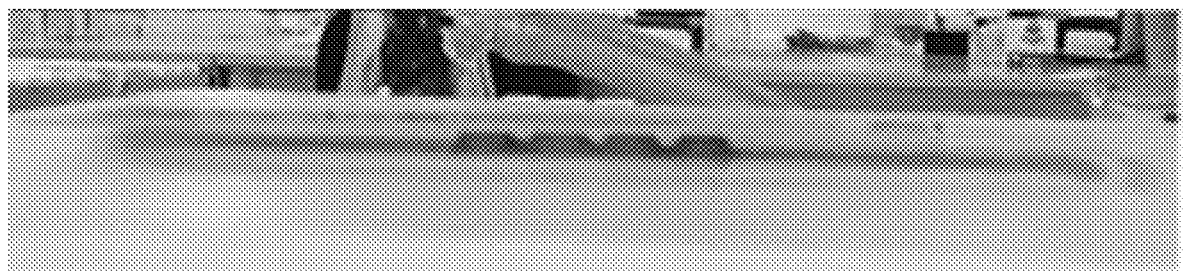
FIG. 38C shows an image of a 3D LCE array actuating an antenna.

The designed shift in frequency is achieved through lifting the antenna above a ground plane. This is done using a novel 3D printed 2×4 LCE array. The array is placed under the antenna and above the ground plane. When heated, each flat element in the LCE array forms into a dome (see FIGS. 38A-38C). As a result, the antenna is elevated from the ground plane, decreasing the parasitic capacitance, and increasing the resonant frequency. The LCE array returns to the flat state upon removal of the heat stimulus.

Figure 39:
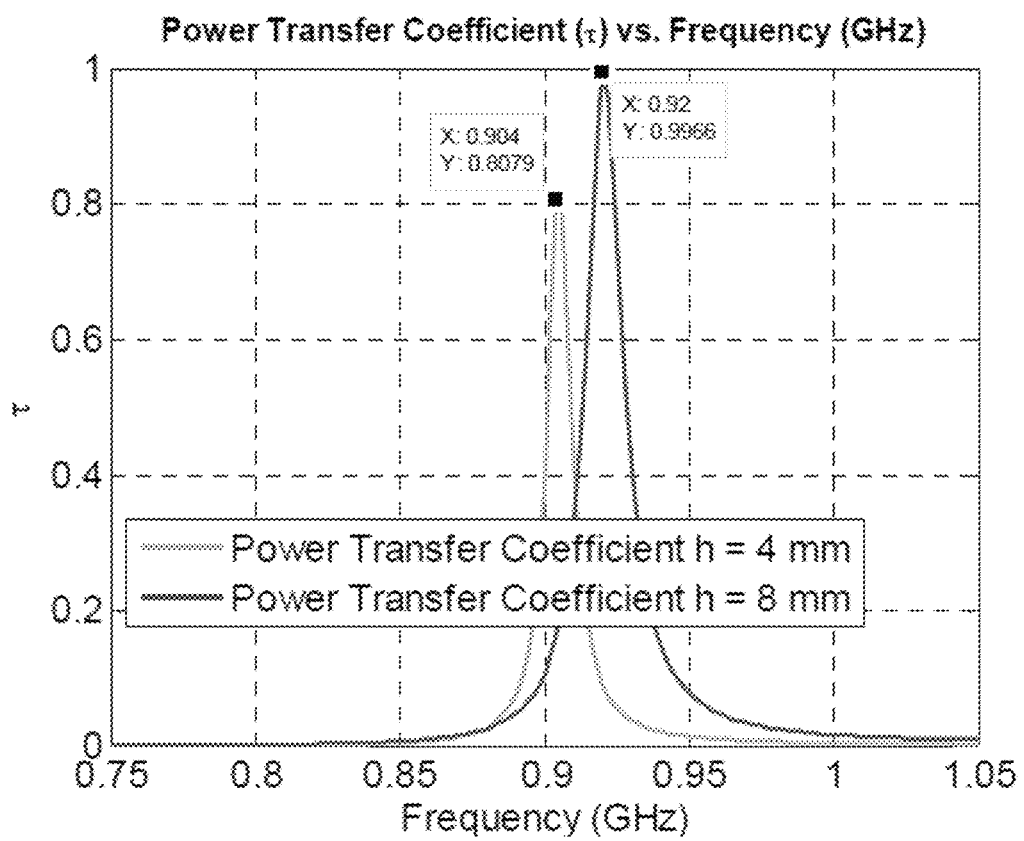
FIG. 39 shows a plot of PTC (τ) versus frequency (GHz) showing the performance of an RFID sensor of an embodiment of the subject invention at operating frequencies of 904 MHz (blue; the line that is farther to the left at τ=0.6) and 920 MHz (red; the line that is farther to the right at τ=0.6).
Figure 40:
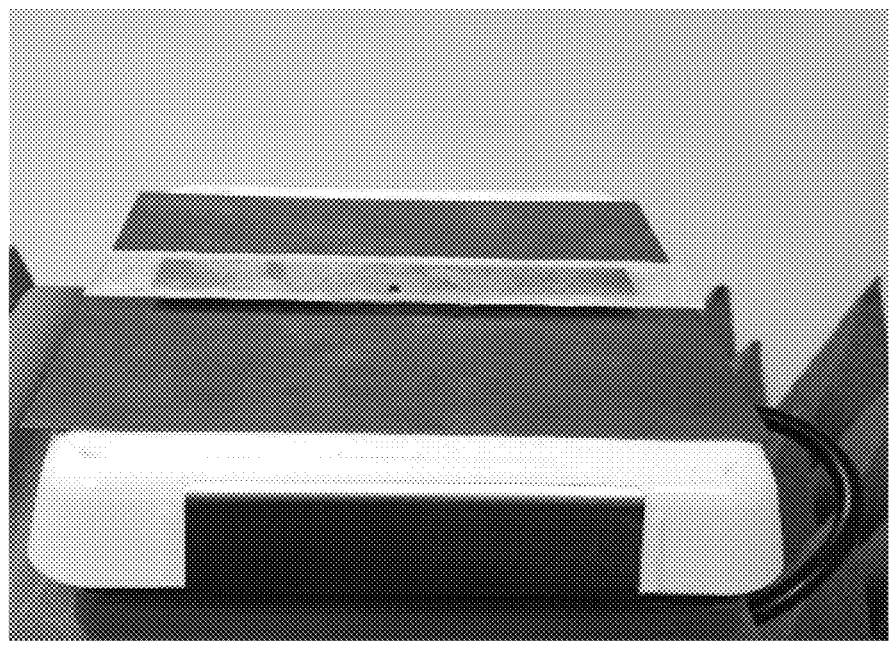
FIG. 40 shows an image of a sensor according to an embodiment of the subject invention, including a customized antenna, an LCE array, and a ground plane.

The length, s, (see FIG. 8) was swept in ANSYS HFSS until the maximum power transfer ($\tau$) was achieved when the antenna is elevated, at 920 MHz. The antenna is then lowered in reference to the ground plane to lower the resonant frequency of the antenna. The ideal length of s is 6 mm and provides a favorable match at both operating frequencies, as shown in FIG. 39. The sensor included a dipole antenna with an ITMN above a ground plane, and it operated by shifting its operating frequency in the RFID band (from 904 MHz to 920 MHz) when the temperature is higher than a set value. This was achieved by using a novel 3D printed LCE array designed to actuate and increase the distance of the RFID antenna from the ground plane when the temperature is above a set value. This actuation is reversible, i.e., when the temperature decreases below this set value, the LCE array will return to original shape thereby bringing the antenna to its original position that is closer to the ground plane. The simulation shows that the sensor operates auspiciously at both 904 MHz and 920 MHz in the RFID band.

Embodiments of the subject invention provide passive (battery-free) RFID real-time temperature sensors based on programmable LCEs. These sensors can monitor the temperature for various applications, including but not limited to monitoring temperature of perishable goods, foods, and medicines in the cold supply chain. The sensors can convey changes in temperature through the controlled shift of the operating frequency (e.g., in the RFID UHF band). For example, a sensor can self-tune from 902 to 928 MHz when the temperature reaches a high threshold and automatically re-tune to 902 MHz at room temperature.

These passive sensors advantageously have the ability to operate through multiple high/low temperature cycles. In an embodiment, the sensor can include a planar dipole antenna with a customized ITMN that is actuated above a ground plane. This actuation adjusts the parasitic capacitance between the antenna and the ground plane. As a result, the antenna shifts operating frequency (see FIG. 1). The actuation is controlled by LCEs structures that change their geometry depending on the temperature, to shift the frequency of the RFID sensor. The sensor's performance was validated through simulations and measurements that agreed well with theory. The design was tested using a standard RFID reader. The first test was a static test to demonstrate the frequency shifting capability of the sensor as the height of the planar antenna changes above the ground plane. That is, as the antenna is actuated from the ground plane the parasitic capacitance reduces (see FIG. 1), and this resulted in the increase of the operating frequency. This relation is reversible, and the results are shown in FIG. 23. The results show that the tag operates as intended. When the antenna is set to the height of 3.1 mm above the ground plane (referring to the black trace), the transmitted power required to activate the sensor is least at 902 MHz; hence, this is the operating frequency. Similarly, when the antenna is actuated to a height of 6.8 mm above the ground plane, the sensor then operates at 928 MHz (referring to the red trace in FIG. 23). Subsequently, a dynamic test was conducted on the RFID sensor, which verified its operation under different temperatures. In this test, the state-of-the-art 4D printed LCE Archimedean chord array was placed between the antenna and the ground plane (see FIGS. 25A and 25B). The data confirm that the RFID passive sensor operates as expected. Specifically, at room temperature, the LCE is in its flat and relaxed state holding the antennas 3.1 mm above the ground plane. At this height, the measured transmitted power is at the minimum at 902 MHz, which corresponds to the intended operating frequency. Moreover, as the heat source is activated, to 160° C., the LCE actuates the antenna to 7.1 mm above the ground plane. As a result, the measured transmitted power is at the minimum at 928 MHz, which corresponds to the operating frequency. The test was conducted with two cycles to demonstrate the continuous and repeatable operation of the sensor.

Advantageous features of the temperature sensors of embodiments of the subject invention include but are not limited to: (a) they are passive, i.e., no battery is needed, thereby having very long lifetime and very low cost; (b) they can be reused multiple times (vs. other related art sensors that can only detect one temperature threshold) to monitor when the temperature reaches a high temperature threshold as well as when the temperature drops below a temperature threshold; and (c) they provide continuous monitoring of goods that can assist in intelligent assessment of their quality.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A passive, radio frequency identification (RFID) temperature sensor, comprising:
   a ground plane;
   an antenna disposed above the ground plane; and
   a liquid crystal elastomer (LCE) disposed between the ground plane and the antenna, the antenna having a first operating frequency when an ambient temperature is below a predetermined threshold temperature and a second operating frequency different from the first operating frequency when the ambient temperature is at or above the predetermined threshold temperature,
the temperature sensor being configured such that the antenna is actuated above the ground plane by the LCE, such that LCE expands or contracts as the temperature changes to change the first operating frequency to the second operating frequency or the second operating frequency to the first operating frequency, thereby resulting in the ambient temperature being sensed based on whether the antenna is operating at the first operating frequency or the second operating frequency,
the temperature sensor being configured to operate normally without a battery or other power source.

2. The temperature sensor according to claim 1, the antenna being a planar antenna.

3. The temperature sensor according to claim 1, the antenna being a planar dipole antenna.

4. The temperature sensor according to claim 3, the planar dipole antenna comprising an integrated T-match network (ITMN).

5. The temperature sensor according to claim 1, the first operating frequency being 902 megahertz (MHz) and the second operating frequency being 928 MHz.

6. The temperature sensor according to claim 1, the predetermined threshold temperature being 160° C.

7. The temperature sensor according to claim 1, the LCE comprising a shape memory polymer.

8. The temperature sensor according to claim 1, the LCE being a 4D-printed LCE array.

9. The temperature sensor according to claim 1, the antenna being a patch antenna comprising a slot,
the temperature sensor further comprising a switch positioned in the slot of the patch antenna,
the temperature sensor being configured such that when the LCE expands or contracts as the temperature changes, the switch engages or disengages to thereby change the first operating frequency to the second operating frequency or the second operating frequency to the first operating frequency,
the switch being a separate element from the LCE.

10. A method of monitoring temperature, the method comprising:
providing a passive, radio frequency identification (RFID) temperature sensor, the temperature sensor comprising:
a ground plane;
an antenna disposed above the ground plane; and
a liquid crystal elastomer (LCE) disposed between the ground plane and the antenna,
the antenna having a first operating frequency when an ambient temperature is below a predetermined threshold temperature and a second operating frequency different from the first operating frequency when the ambient temperature is at or above the predetermined threshold temperature,
the temperature sensor being configured such that the antenna is actuated above the ground plane by the LCE, such that LCE expands or contracts as the temperature changes to change the first operating frequency to the second operating frequency or the second operating frequency to the first operating frequency, thereby resulting in the ambient temperature being sensed based on whether the antenna is operating at the first operating frequency or the second operating frequency,
the temperature sensor being configured to operate normally without a battery or other power source; and
monitoring an operating frequency of the antenna of the temperature sensor, such that when the antenna is operating at the first operating frequency the ambient temperature is below the predetermined threshold temperature and when the antenna is operating at the second operating frequency the ambient temperature is at or above the predetermined threshold temperature.

11. The method according to claim 10, the antenna being a planar dipole antenna.

12. The method according to claim 1, the planar dipole antenna comprising an integrated T-match network (ITMN).

13. The method according to claim 10, the antenna being actuated above the ground plane by the LCE expanding as the predetermined threshold temperature is reached and exceeded, causing the first operating frequency to change to the second operating frequency.

14. The method according to claim 10, the first operating frequency being 902 megahertz (MHz) and the second operating frequency being 928 MHz.

15. The method according to claim 10, the predetermined threshold temperature being 160° C.

16. The method according to claim 10, the LCE comprising a shape memory polymer.

17. The method according to claim 10, the LCE being a 4D-printed LCE array.

18. The method according to claim 10, the antenna being a patch antenna comprising a slot,
the temperature sensor further comprising a switch positioned in the slot of the patch antenna, and
the temperature sensor being configured such that when the LCE expands or contracts as the temperature changes, the switch engages or disengages to thereby change the first operating frequency to the second operating frequency or the second operating frequency to the first operating frequency.

19. A passive, radio frequency identification (RFID) temperature sensor, comprising:
a ground plane;
an antenna disposed above the ground plane; and
a liquid crystal elastomer (LCE) disposed between the ground plane and the antenna,
the antenna having a first operating frequency when an ambient temperature is below a predetermined threshold temperature and a second operating frequency different from the first operating frequency when the ambient temperature is at or above the predetermined threshold temperature, and
the temperature sensor being configured to operate normally without a battery or other power source,
the antenna being a planar dipole antenna comprising an integrated T-match network (ITMN),
the temperature sensor being configured such that the antenna is actuated above the ground plane by the LCE, such that LCE expands or contracts as the temperature changes to change the first operating frequency to the second operating frequency or the second operating frequency to the first operating frequency, thereby resulting in the ambient temperature being sensed based on whether the antenna is operating at the first operating frequency or the second operating frequency,
the first operating frequency being 902 megahertz (MHz) and the second operating frequency being 928 MHz, the predetermined threshold temperature being 160° C., and the LCE being a 4D-printed LCE array comprising a shape memory polymer.

* * * * *